US008474706B2

(12) United States Patent
Ohsugi

(10) Patent No.: US 8,474,706 B2
(45) Date of Patent: Jul. 2, 2013

(54) PRINTING APPARATUS WITH PRE-CHARGING UNIT

(75) Inventor: Jitsui Ohsugi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/136,549

(22) Filed: Aug. 4, 2011

(65) Prior Publication Data

US 2012/0031968 A1 Feb. 9, 2012

(30) Foreign Application Priority Data

Aug. 4, 2010 (JP) ................................. 2010-175818

(51) Int. Cl.
*G06K 19/00* (2006.01)

(52) U.S. Cl.
USPC .............. 235/380; 235/375; 235/379; 705/5; 705/35

(58) Field of Classification Search
USPC ................... 235/375, 379, 380; 705/5, 35–45
See application file for complete search history.

(56) References Cited

U.S. PATENT DOCUMENTS

| 8,205,797 B2* | 6/2012 | Tredoux et al. ............... 235/383 |
| 2006/0065715 A1* | 3/2006 | Kojima et al. ................. 235/380 |
| 2009/0313154 A1 | 12/2009 | Kamei et al. |

FOREIGN PATENT DOCUMENTS

| JP | 2007-140990 A | 6/2007 |
| JP | 2007-299293 A | 11/2007 |
| JP | 2009-301244 A | 12/2009 |
| JP | 2010-097314 A | 4/2010 |

* cited by examiner

*Primary Examiner* — Michael G Lee
*Assistant Examiner* — Matthew Mikels
(74) *Attorney, Agent, or Firm* — Edwards Wildman Palmer LLP; David G. Conlin; David A. Tucker

(57) ABSTRACT

A charging processing unit calculates a pre-charged amount of money based on print conditions and charges the calculated pre-charged amount of money to a card through a card reader. A job control unit starts a print job to print until a penultimate page, when pre-charging is finished. Further, when an accumulated amount of money is specified by generating image data of the final page and the accumulated amount of money is smaller than the pre-charged amount of money, the printing is stopped before the final page is printed. The charging processing unit causes an UI control unit to display a message requesting to place the card again. When the card is placed in response to the message and pieces of the card information matches each other, a refunding process is carried out. The job control unit restarts printing the final page after a refunding process.

11 Claims, 15 Drawing Sheets

PRINTING APPARATUS WITH PRE-CHARGING UNIT

CROSS-REFERENCE TO RELATED APPLICATION

This application claims priority to Japanese Patent Application No. 2010-175818, which was filed on Aug. 4, 2010, the contents of which are incorporated herein by reference in its entirety.

BACKGROUND OF THE TECHNOLOGY

1. Field of the Technology

The present technology relates to a printing apparatus capable of refunding a difference between an advanced payment in electronic money and a charge for printing or the like.

2. Description of the Related Art

As a printing apparatus, there have been a printing apparatus that receives and prints print data transmitted from an information processor such as a personal computer, or a printing apparatus that directly prints image data stored in a memory card or a universal serial bus (hereinafter, referred to as a "USB") memory through a memory card reader or USB terminal.

The printing apparatuses described above include a printing apparatus to which is connected a payment apparatus for a payment before printing by presenting an integrated circuit (hereinafter, referred to as an "IC") card charged with electronic money. The payment-apparatus-connected printing apparatus refunds a difference between the amount of money actually required for printing after the printing and the pre-charged amount of money in electronic money, by requesting re-presentation of the IC card.

The reason for prepayment is that adverse cases may be considered by a user or manager, such as when printing cannot be completed due to lack of the balance during a print job or when copies are taken without rightly paying the charge, without being charged, by removing the IC card from the card reader, before paper is discharged.

When prepayment is made, the printing apparatus calculates the charge that should be paid, based on whether color printing or monochrome printing is made, and the number of print pages. The number of print pages is included in the information on the print job, such that the printing apparatus can easily grasp the number of pages to be printed. However, since it is difficult to determine whether the input print data is for color or monochrome, in the short period of time before printing starts, generally, the user designates whether color printing or monochrome printing is made and pays in advance in accordance with the designation.

For example, when a color-monochrome mixed print job including both of color printing and monochrome printing is carried out with monochrome designated, all pages are printed in monochrome and payment is charged at the price of monochrome printing for all of the pages. Further, when the color-monochrome mixed print job is carried out with the color designated, all pages are printed in color, and even though monochrome pages are included, payment is charged at the price of color printing for all of the pages. However, since the price of color printing is paid even for the monochrome pages when it is designated that all of the pages are printed in color, it is disadvantageous for the user.

As described above, since monochrome print data is for monochrome printing even if color printing is designated, when the user designates color printing, a difference may be generated between the pre-charged amount of money and the amount of money for the actual print result. Although it is required to print in an automatic color-monochrome mode in which whether print data is color or monochrome is automatically determined and printing is carried out, in order to determine whether print data is color or monochrome, it is necessary to convert the print data into cyan-magenta-yellow-black (CMYK) data and a process that takes time is necessarily carried out. That is, in order to charge the exact amount of money a process of converting print data for all pages into the CMYK data is necessary, such that the user is made wait for a long time. In order to remove the disadvantage for the user described above without making the user wait for a long time, when there is a difference, a technique of reliably refunding the difference to the user is required.

Further, even if the user cancels printing or changes the print setup during a print job, there may be a case where a difference is generated between the pre-charged amount of money and the amount of money for the actual print result. When a difference is generated, as described above, between the pre-charged amount of money and the amount of money for the actual print result, implementing a technique to reliably refunding the difference to the user is a challenge.

A charge collection system is disclosed in Japanese Unexamined Patent Publication JP-A 2007-140990, which is a first example of the related art. Printing is carried out, after the charge collection system subtracts the amount of price for the selected entire print job from the balance in an IC card and then collects the price. When the printing process is stopped halfway before being normally completed, the price for the non-processed part is refunded, with the IC card placed.

A charging system is disclosed in Japanese Unexamined Patent Publication JP-A 2007-299293, which is a second example of the related art. The charging system draws an estimate amount of money for printing, out of an account, as electronic money and deposits the money. Further, when printing is finished, the difference between the deposited money and the amount of money for printing becomes a non-settled money, and settlement is made based on the account and the non-settled money when an IC card is touched, in response to a settlement screen displayed when there is non-settled money.

A job performing apparatus that has functions of charging and refunding, using electronic money is disclosed in Japanese Unexamined Patent Publication JP-A 2009-301244, which is a third example of the related art. The job performing apparatus charges the use amount of money required for performing a job before starting the job, and can refund within a predetermined period by setting a medium for payment in a paying device, when the balance is generated.

However, although all of the first to third examples of the related art perform settlement such as refunding, by presenting again an IC card when a difference is generated between the pre-charged amount of money and the amount of money for the print result, a user may return with the printed recording paper after printing is finished, missing settlement. Further, when settlement is not made and how the next print job is started and how to settle the difference that is not settled from the user may be considered.

SUMMARY OF THE TECHNOLOGY

An object of the technology is to provide a printing apparatus capable of preventing or suppressing a difference between an amount of money charged in advance by electronic money for printing and an amount of money for a print result from being not settled.

The technology provides a printing apparatus comprising:

a recording unit that reads out and rewrites an amount of money recorded on a recording medium which has come in contact therewith or has approached thereto;

a printing unit that prints print data based on predetermined print conditions;

a pre-charging unit that makes pre-charging by calculating an estimate amount of charge that is estimated to be required for printing the print data based on predetermined print conditions, reading out the amount of money recorded on the recording medium through the recording unit, subtracting the estimate amount of charge from the read-out amount of money, and rewriting the amount of money recorded on the recording medium into the subtracted amount of money through the recording unit; and a control unit that causes printing by the printing unit to be started when pre-charging is made by the pre-charging unit, and stops a printing process that is a process relating to printing when an estimate-amount-of-money changing factor which causes a change in the estimate amount of money is generated after initiation of the printing in the printing unit, the pre-charging unit calculating again the estimate amount of money changing in accordance with the generation of the estimate-amount-of-money changing factor when the printing process is stopped by the control unit, and making settlement by rewriting the amount of money recorded on the recording medium by the recording unit based on a re-calculated estimate amount of money, and the control unit causing the printing unit to restart the printing process after the rewriting by the pre-charging unit is done.

The recording unit can read out and rewrite the amount of money recorded on the recording medium, when the recording medium where the charged amount of electronic money comes in contact with or approaches to the recording unit. The printing unit prints the print data based on predetermined print conditions. The pre-charging unit makes pre-charging by calculating the estimate amount of money requested for printing the print data based on the predetermined print conditions, reading out the amount of money recorded on the recording medium through the recording unit, subtracting the estimate amount of money from the read-out amount of money, and rewriting the amount of money recorded on the recording unit into the subtracted amount of money through the recording unit. The control unit causes printing by the printing unit to be started when pre-charging is made by the pre-charging unit, and stops a printing process that is a process relating to printing when an estimate-amount-of-money changing factor which causes a change in the estimate amount of money is generated after initiation of printing in the printing unit. Further, the pre-charging unit calculates again the estimate amount of money changed in accordance with generation of the estimate-amount-of-money changing factor when the printing process is stopped by the control unit, and performs settlement by rewriting the amount of money recorded on the recording medium by the recording unit based on the re-calculated estimate amount of money. Further, the control unit causes the printing unit to restart the printing process after rewriting by the pre-charging unit is done.

Therefore, when the estimate-amount-of-money changing factor is generated, for example, there is possibility of generating a difference in a printing system that makes pre-charging, the printing process is stopped, that is, a limit is applied to the operation of a print job, such that a user is forced to present the recording medium, for example, a card, such that the number or cases in which the difference is not settled is reduced. That is, it is possible to reduce the number of cases in which the difference between the amount of money charged in advance by the electronic money for printing and the amount of money for the print result is not settled.

Further, it is preferable that the printing process includes a process of printing by the printing unit, and the control unit causes the printing unit to stop the printing process.

The printing process includes a process of printing by the printing unit. Further, the control unit causes the printing unit to stop the printing process. Accordingly, the control unit can perform settlement of the difference by stopping the printing process, that is, the print job, by controlling the printing unit.

Further, it is preferable that the printing unit prints print data onto the print medium, the printing apparatus further comprises a holding part that keeps the printed print medium and a preventing part that prevents the print medium kept in the holding part from being taken out, the printing process includes a process of taking out the printed print medium, and the control unit causes the printing unit to stop the printing process by preventing the print medium kept in the holding part from being taken out through the preventing part.

The printing unit prints the print data onto the print medium. The holding part keeps the printed print medium and the preventing part prevents the print medium kept in the holding part from being taken out. The printing process includes a process of taking out the printed print medium. Further, the control unit causes the printing unit to stop the printing process, that is, the print job by preventing the print medium kept in the holding part from being taken out through the preventing part. Therefore, since the printed print medium is prevented from being taken out until the difference is settled, even if printing the final page is finished, it is possible to reduce the cases in which the difference is not settled.

Further, it is preferable that the control unit ascertains whether an estimate-amount-of-money changing factor is generated before the printing unit finishes printing a penultimate page and starts printing a final page.

The control unit ascertains whether the estimate-amount-of-money changing factor is generated before the printing unit finishes printing the penultimate page before the final page and starts printing the final page. Therefore, it is required to settle the difference in order to print the final page, such that it is possible to reduce the cases in which the difference is not settled.

Further, it is preferable that the control unit ascertains whether an estimate-amount-of-money changing factor is generated before the printing unit finishes printing each page and starts printing a next page.

The control unit ascertains whether the estimate-amount-of-money changing factor is generated before the printing unit finishes printing each page and starts printing a next page. Therefore, it is possible to quickly inform the user that a change is generated after charging.

Further, it is preferable that the printing apparatus further comprises:

a designating unit that designates a print mode including an automatic color-monochrome mode that prints print data in accordance with color or monochrome;

an input unit that inputs print information including print data for printing in the printing unit and a number of pages for the print data; and a notification unit that notifies the information, and the predetermined print condition includes at least a number of pages included in the print information inputted by the input unit and the print mode designated by the designating unit, the pre-charging unit calculates an amount of money under an assumption that the all pages are printed in color, when a print mode designated by the designating unit is an automatic color-monochrome mode, the estimate-amount-of-money changing factor includes a first estimate-amount-of-money changing factor in which the amount of money for the automatic color-monochrome mode does not match the estimate amount of money, the control unit causes the printing unit to stop printing when the first estimate-amount-of-money changing factor is generated, and the pre-charging unit causes the notification unit to notify that the recording medium is requested to come in contact with or approach to the recording unit, and rewrites the amount of money recorded on the recording unit through the recording unit based on the re-calculated estimate amount of money, when the recording medium comes in contact with or approaches to the recording unit in response to the notification of the notification unit.

The designating unit designates a print mode including an automatic color-monochrome mode that prints the print data in accordance with color or monochrome. The input unit inputs print information including print data for printing in the printing unit and a number of pages for the print data. The notification unit notifies the information. The predetermined print condition includes at least a number of pages included in the print information inputted by the input unit and the print mode designated by the designating unit. The pre-charging unit calculates an amount of money under an assumption that all the pages are printed in color, when the print mode designated by the designating unit is an automatic color-monochrome mode. The estimate-amount-of-money changing factor includes a first estimate-amount-of-money changing factor in which the amount of money for the automatic color-monochrome mode does not match the estimate amount of money. The control unit causes the printing unit to stop printing when the first estimate-amount-of-money changing factor is generated. The pre-charging unit causes the notification unit to notify that the recording medium is requested to come in contact with or approach to the recording unit, and rewrites the amount of money recorded on the recording unit through the recording unit based on the re-calculated estimate amount of money, when the recording medium comes in contact with or approaches to the recording unit in response to the notification of the notification unit.

Therefore, when a difference is refunded, the recording medium, for example, a card is requested to be placed and the difference is refunded before a print job is finished, and then printing is restarted, such that it is possible to prevent the user from missing a refunding process.

Further, it is preferable that the printing apparatus further comprises a storage unit, and possessor identification information for identifying a possessor of the recording medium is recorded on the recording medium, and the pre-charging unit reads out the possessor identification information recorded on the recording medium through the recording unit when making pre-charging, and stores the re-calculated estimate amount of money and the possessor identification information read out during pre-charging in the storage unit to correspond to each other, when the recording medium does not come in contact with or approach to the recording unit within a predetermined time in response to the notification of the notification unit.

The possessor identification information for identifying the possessor of the recording medium is recorded on the recording medium. The pre-charging unit reads out the possessor identification information recorded on the recording medium through the recording unit when making pre-charging, and stores the re-calculated estimate amount of money and the possessor identification information read out during pre-charging in the storage unit to correspond to each other, when the recording medium does not come in contact with or approach to the recording unit within a predetermined time in response to the notification of the notification unit.

Therefore, when a fact that the recording medium is requested to come in contact with or approach to the recording unit is continually informed, for example, when a card-requesting message displayed for refunding is continually displayed, it may be considered that the next user places the recording medium, for example, a card by mistake. When a predetermined time set by the manager has passed, it is possible to minimize influence on the next user by storing the information on the previous user, that is, the possessor identification information and removing the display of the message.

Further, it is preferable that the printing apparatus further comprises a storage unit, and possessor identification information for identifying the possessor of the recording medium is recorded on the recording medium, the pre-charging unit reads out the possessor identification information from the recording medium through the recording unit when making pre-charging, and reads out the possessor identification information from the recording medium through the recording unit when the recording medium comes in contact with or approaches to the recording unit within a predetermined time in response to the notification of the notification unit, and stores the re-calculated estimate amount of money and the possessor identification information read out during pre-charging in the storage unit in association with each other when the read-out possessor identification information is different from the possessor identification information read out during the pre-charging.

The possessor identification information for identifying the possessor of the recording medium is recorded on the recording medium. The pre-charging unit reads out the possessor identification information from the recording medium through the recording unit when making pre-charging, and reads out the possessor identification information from the recording medium through the recording unit when the recording medium comes in contact with or approaches to the recording unit within a predetermined time in response to the notification of the notification unit, and stores the re-calculated estimate amount of money and the possessor identification information read out during pre-charging in the storage unit in association with each other when the read-out possessor identification information is different from the possessor identification information read out during the pre-charging.

Therefore, if the next user places another recording medium, for example, a card, and the card is determined as a different card by cross-checking the card, the difference is not refunded and the possessor identification information of the card that should be refunded, that is, the card information and the refund amount of money are temporarily stored, such that a print job of the next user can be started. That is, it is possible to prevent the printing apparatus from being locked due to the refunding process being missed.

Further, it is preferable that the pre-charging unit reads out the possessor identification information from the recording medium through the recording unit when the recording medium comes in contact with or approaches to the recording unit, and performs settlement by rewriting the amount of money recorded on the recording medium having the same possessor identification information through the recording unit, based on the re-calculated estimate amount of money that is stored in the storage unit when the read-out possessor identification information matches the possessor identification information that is stored, in association with the estimate amount of money calculated again in the storage unit, and the control unit causes the printing unit to print print data included in new print information inputted by the input unit, after rewriting by the pre-charging unit is done.

The pre-charging unit reads out the possessor identification information from the recording medium through the recording unit when the recording medium comes in contact with or approaches to the recording unit, and performs settlement by rewriting the amount of money recorded on the recording medium having the same possessor identification information through the recording unit, based on the re-calculated estimate amount of money that is stored in the storage unit when the read-out possessor identification information matches the possessor identification information that is stored, in association with the estimate amount of money calculated again in the storage unit. Further, the control unit causes the printing unit to print print data included in new print information inputted by the input unit, after rewriting by the pre-charging unit is done. Therefore, it is possible to perform a refunding process by placing again the recording medium, for example, a card at the next time, even if the user misses a refunding process.

Further, it is preferable that the printing apparatus further comprises a communication unit that communicates information with another printing apparatus, and when the recording medium comes in contact with or approaches to the recording unit, the pre-charging unit reads out the possessor identification information from the recording medium through the recording unit and transmits the read-out possessor identification information to another printing apparatus through the communication unit, and when a fact that possessor identification information that matches the transmitted possessor identification information, and the estimate amount of money that is calculated again, associated with the possessor identification information are stored in the storage unit of another printing apparatus, and the estimate amount of money stored in the storage unit are received by the communication unit from the another printing apparatus, the pre-charging unit rewrites the amount of money recorded on the recording medium through the recording unit, based on the estimate amount of money received by the communication unit.

The communication unit communicates information with another printing apparatus. When the recording medium comes in contact with or approaches to the recording unit, the pre-charging unit reads out the possessor identification information from the recording medium through the recording unit and transmits the read-out possessor identification information to another printing apparatus through the communication unit. When a fact that possessor identification information that matches the transmitted possessor identification information and the estimate amount of money that is calculated again, associated with the possessor identification information are stored in the storage unit of another printing apparatus, and the estimate amount of money stored in the storage unit are received by the communication unit from the another printing apparatus, the pre-charging unit rewrites the amount of money recording on the recording medium through the recording unit, based on the estimate amount of money received by the communication unit. Therefore, it is possible to refund the refund amount of money generated in a specific printing apparatus even in another printing apparatus connected to a network, such that it is possible to improve convenience for the user.

Further, it is preferable that on the recording medium is stored possessor identification information for identifying a possessor of the recording medium, the printing apparatus further comprises a communication unit that communicates information with a server apparatus, the pre-charging unit reads out in pre-charging the processor identification information recorded on the recording medium, through the recording unit, and when the recording medium does not come in contact with or approach to the recording unit within a predetermined time in response to the notification of the notification unit, or when the recording medium comes in contact with or approaches to the recording unit within a predetermined time in response to the notification of the notification unit and the possessor identification information read out from the recording medium by the recording unit is different from the read-out possessor identification information, the pre-charging unit transmits the re-calculated estimate amount of money and the read-out possessor identification information to the server apparatus through the communication unit, and causes the server apparatus to store them.

On the recording medium is recorded possessor identification information for identifying the possessor of the recording medium. A communication unit communicates information with a server apparatus. The pre-charging unit reads out in pre-charging the possessor identification information recorded on the recording medium, through the recording medium, and when the recording medium does not come in contact with or approach to the recording unit within a predetermined time in response to the notification of the notification unit, or when the recording medium comes in contact with or approaches to the recording unit within a predetermined time in response to the notification of the notification unit and the possessor identification information read out from the recording medium by the recording unit is different from the read-out possessor identification information, the pre-charging unit transmits the re-calculated estimate amount of money and the read-out possessor identification information to the server apparatus through the communication unit, and causes the server apparatus to store them.

Therefore, the possessor identification information, that is, the card information and the refund amount of money are not managed in each printing apparatus, but centrally managed by the server apparatus, such that convenience of the manager is improved. For example, it may be possible not to be in conscious of that the information on the refund amount of money remains in the printing apparatus when the printing apparatus is replaced or abolished.

Further, it is preferable that the printing apparatus further comprises a notification unit that notifies information, and the pre-charging unit causes the notification unit to notify after the control unit causes the printing unit to start printing that printing can be stopped by contacting or approaching the recording medium to the recording unit, the control unit causes the printing unit to stop printing when the recording medium comes in contact with or approaches to the recording unit in response to the notification of the notification unit, the pre-charging unit causes the notification unit to notify ascertainment information for ascertaining the stop of printing when the printing by the printing unit is stopped by the control unit, and performs settlement by calculating again the estimate amount of money, and rewriting the amount of money recorded on the recording medium through the recording unit based on the re-calculated estimate amount of money when print stop information instructing stop of printing is inputted by the input unit in response to the notification of the ascertainment information by the notification unit, and the control unit causes the printing unit to finish the printing after rewriting by the pre-charging unit is done.

The notification unit notifies information. The pre-charging unit causes the notification unit to notify after the control unit causes the printing unit to start printing that printing can be stopped by contacting or approaching the recording medium to the recording unit. The control unit causes the printing unit to stop printing in the case where the recording medium comes in contact with or approaches to the recording unit in response to the notification of the notification unit. The pre-charging unit causes the notification unit to notify ascertainment information for ascertaining the stop of printing, when the printing by the printing unit is stopped by the control unit and performs settlement by calculating again the estimate amount of money, and rewriting the amount of money recorded on the recording medium through the recording unit based on the re-calculated estimate amount of money when print stop information instructing stop of printing is inputted by the input unit in response to the notification of the ascertainment information by the notification unit. The control unit causes the printing unit to finish the printing after rewriting by the pre-charging unit is done.

Therefore, it is possible to prevent a refunding process from being missed when a job is canceled, not by refunding the difference by placing the recording medium, that is a card after printing is stopped, that is, the print job is finished being canceled, but by placing the card to turn to a state where stop of printing is ascertained, for example, a state where the cancel execution key can be pressed, and performing refunding at the pressing-timing.

Further, it is preferable that the printing apparatus further comprises a display unit that displays information, and the estimate-amount-of-money changing factor includes a second estimate-amount-of-money changing factor that is a factor which changes the predetermined print conditions, the pre-charging unit causes the display unit to display a fact that the predetermined print conditions can be changed by contacting or approaching the recording medium to the recording unit, after the control unit causes the printing unit to start printing, the control unit causes the printing unit to stop printing, when the recording medium comes in contact with or approaches to the recording unit in response to the display of the display unit, and the pre-charging unit calculates again the estimate amount of money based on predetermined print conditions changed by the second estimate-amount-of-money changing factor when the printing unit is caused by the control unit to stop the printing, and refunds a difference to the recording medium through the recording unit when the re-calculated estimate amount of money is smaller than the pre-charged amount of money.

The display unit displays information. The estimate-amount-of-money changing factor includes a second estimate-amount-of-money changing factor that is a factor which changes the predetermined print conditions. The pre-charging unit causes the display unit to display a fact that the predetermined print conditions can be changed by contacting or approaching the recording medium to the recording unit, after the control unit causes the printing unit to start printing. The control unit causes the printing unit to stop the printing, when the recording medium comes in contact with or approaches to the recording unit in response to the display of the display unit. The pre-charging unit calculates again the estimate amount of money based on the predetermined print conditions changed by the second estimate-amount-of-money changing factor when the printing unit is caused by the control unit to stop the printing, and refunds a difference to the recording medium through the recording unit when the re-calculated estimate amount of money is smaller than the pre-charged amount of money.

Therefore, when the predetermined print condition, for example, the print setup is changed and the refund amount of money is generated during printing, for example, while a print job is carried out, it is possible to prevent the user from missing a refunding process, not by refunding the difference by placing the recording medium, for example a card after the print job is finished, but by placing the card to turn to a state where the configuration can be changed, and allowing refunding at a specific timing when the configuration change is determined.

Further, it is preferable that the printing apparatus further comprises a display unit that displays information and the estimate-amount-of-money changing factor includes a second estimate-amount-of-money changing factor that is a factor which changes the predetermined print conditions, and the pre-charging unit causes the display unit to display a fact that the predetermined print conditions can be changed by contacting or approaching the recording medium to the recording unit, after the control unit causes the printing unit to start printing, the control unit causes the printing unit to stop printing, when the recording medium comes in contact with or approaches to the recording unit in response to the display of the display unit, and the pre-charging unit calculates again the estimate amount of money based on predetermined print conditions changed by the second estimate-amount-of-money changing factor when the printing unit is caused by the control unit to stop the printing, and charges a difference as an additional fee to the recording medium through the recording unit when the re-calculated estimate amount of money is larger than the pre-charged amount of money.

The display unit displays information. The estimate-amount-of-money changing factor includes a second estimate-amount-of-money changing factor that is a factor which changes the predetermined print conditions. The pre-charging unit causes the display unit to display a fact that the predetermined print conditions can be changed by contacting or approaching the recording medium to the recording unit, after the control unit causes the printing unit to start printing. The control unit causes the printing unit to stop the printing, when the recording medium comes in contact with or approaches to the recording unit in response to the display of the display unit. The pre-charging unit calculates again the estimate amount of money based on the predetermined print conditions changed by the second estimate-amount-of-money changing factor when the printing unit is caused by the control unit to stop the printing, and charges a difference as an additional fee to the recording medium through the recording unit when the re-calculated estimate amount of money is larger than the pre-charged amount of money.

Therefore, when the predetermined print condition, for example, the print setup is changed and the additional fee is generated during printing, for example, while a print job is carried out, it is possible to prevent the user from missing a charging process, not by charging by placing the recording medium, for example, a card after the print job is finished, but by placing the card to turn to a state where the print setup can be changed, and charging at a timing when the print setup is changed.

BRIEF DESCRIPTION OF THE DRAWINGS

Other and further objects, features, and advantages of the technology will be more explicit from the following detailed description taken with reference to the drawings wherein.

DETAILED DESCRIPTION

Figure 1:
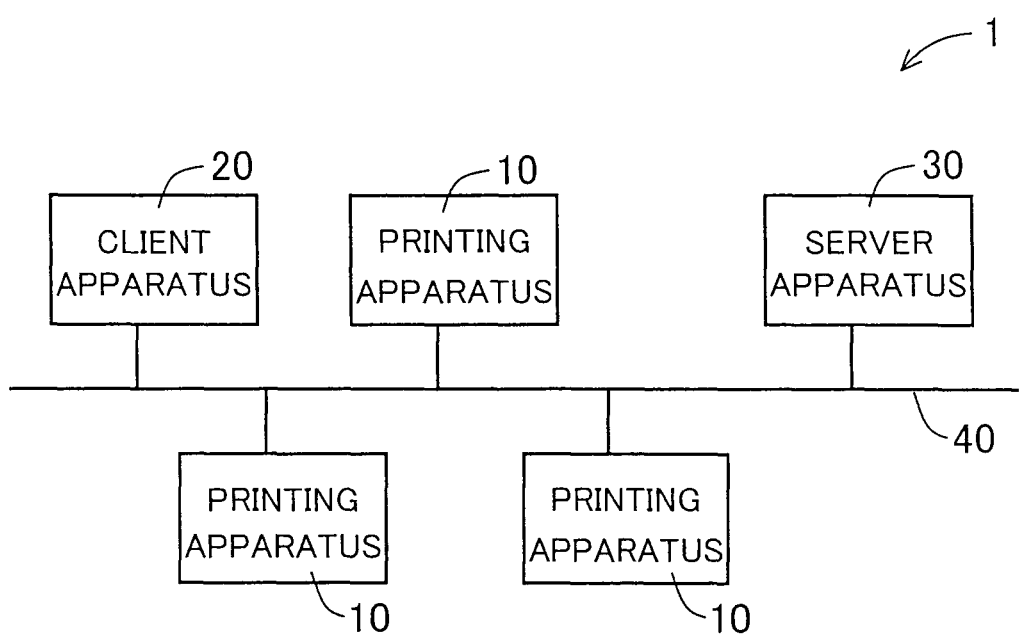
FIG. 1 is a block diagram showing the configuration of a printing system including a printing apparatus according to one embodiment.

Now referring to the drawings, preferred embodiments will be described.

FIG. 1 is a block diagram showing the configuration of a printing system 1 including a printing apparatus 10 according to one embodiment. The printing system 1 includes the printing apparatus 10, a client apparatus 20, and a server apparatus 30.

Although three printing apparatuses 10 are shown in FIG. 1, the number of the printing apparatuses 10 is not limited to three, and one or two may be possible, or four or more may be possible. The printing apparatuses 10, the client apparatus 20, and the server apparatus 30 are all connected to a network 40, such that they can communicate information with each other through the network 40 therebetween. The network 40 is implemented, for example, by a local area network (LAN), a wide area network (WAN), or the Internet. When one printing apparatus 10 is provided, the client apparatus 20, server apparatus 30, and network 40 may not be provided.

The printing apparatus 10 may be implemented by, for example, a printer apparatus, a copy apparatus, a facsimile apparatus, a scanner apparatus, or a document filing apparatus, or a multi-functional peripheral having some functions of these apparatuses, which have at least a print function. The printing apparatus 10 can read out and print print data received through the network 40 and print data stored in an external storage medium detachably attached to the printing apparatus 10, for example, a universal serial bus (hereinafter, referred to as "USB") memory.

The client apparatus 20 is implemented by, for example, a personal computer or a print server apparatus and transmits a print job to the printing apparatus 10 through the network, and causes the printing apparatus 10 to perform printing by executing the print job. The print job is a work of printing print data, which is the object to print, onto a print medium such as a recording paper. The print job is a print process that is a process relating to printing and includes a process of printing the print data on the print medium and a process of taking the printed print medium out of a paper discharge tray, which is described below. The print job, which is print information, includes print data and attribute information. The attribute information is information such as the number of print pages. The print data is data described by a print description language such as PCL (Printer Control Language) or PDL (Page Description Language). The server apparatus 30 is an apparatus that manages the information transmitted from the printing apparatus 10.

Figure 2:
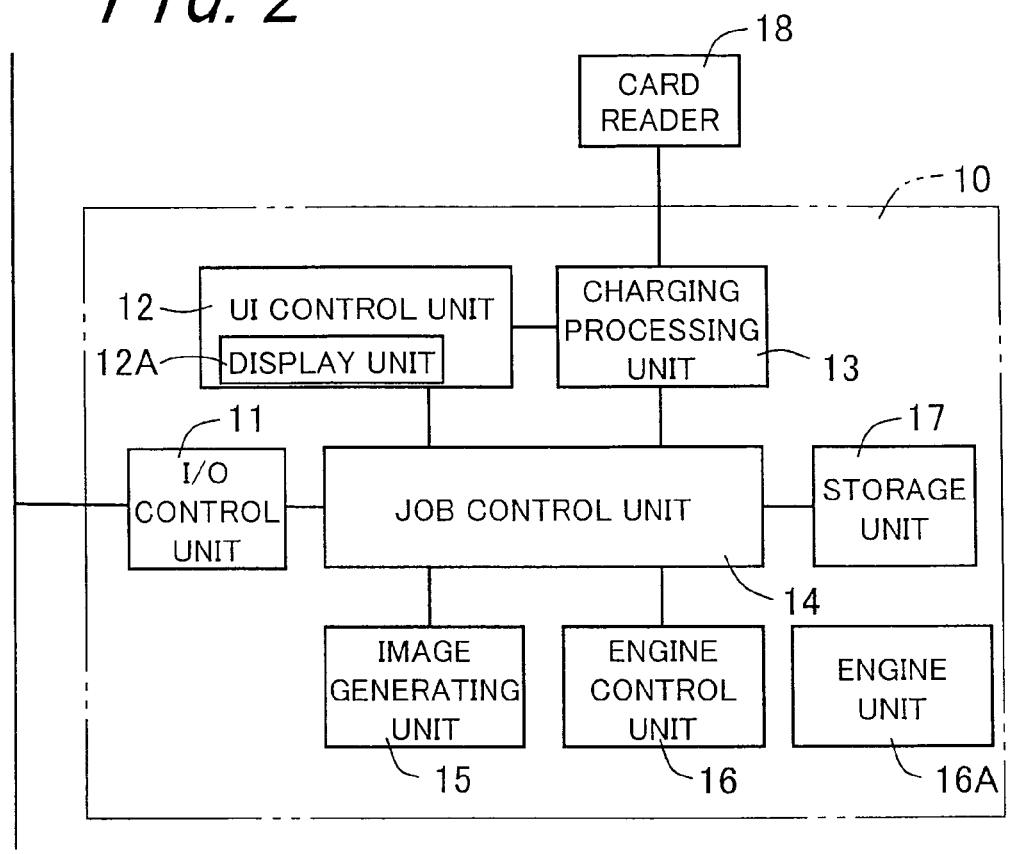
FIG. 2 is a block diagram showing the configuration of the printing apparatus.

FIG. 2 is a block diagram showing the configuration of the printing apparatus 10. The printing apparatus 10 includes an input/output (I/O) control unit 11, a user interface (UI) control unit 12, a charging processing unit 13, a job control unit 14, an image generating unit 15, an engine control unit 16, a storage unit 17, a central processing unit (CPU) (not shown), and an engine unit 16A.

The I/O control unit 11, which is a communication unit, is connected to the network 40 and communicates information with another printing apparatus 10, the client apparatus 20, and the server apparatus 30 that are connected to the network 40. The I/O control unit 11 transmits information received from the job control unit 14 to the apparatuses and sends information received from the apparatuses, for example, a print job, to the job control unit 14. Further, To the I/O controller 11, a detachable external storage device, for example, a USB memory, can be mounted, and the I/O controller 11 can read out print data and attribute information stored in the mounted external storage device, and sends the read print data and attribute information, as a print job, to the job control unit 14.

The UI control unit 12 includes an input unit that inputs information and an output unit that outputs information. For example, when the UI control unit 12 is implemented by a touch panel, the input unit is implemented by a touch sensor that inputs positional information showing the position where fingers or the like come into contact, and sends the input positional information to the charging processing unit 13 or the job control unit 14. The output unit is implemented by a display unit 12A, which displays information, and displays information received from the charging processing unit 13 or the job control unit 14. The charging processing unit 13 or the job control unit 14 causes, for example, the display unit 12A to display operation keys and specifies which operation key is operated, based on the positional information inputted from the input unit. The UI control unit 12 serves as a designating unit, an input unit, and a notification unit.

A card reader 18 is connected to the charging processing unit 13 that serves as a pre-charging unit. For example, when a card of contact type or non-contact type is placed, the card reader 18 that serves as a recording unit communicates the information with the card to record or read out information onto/from the card. Placing the card over the card reader 18 means contacting a card of contact type to the card reader 18 or contacting or approaching a card of non-contact type to the card reader 18. For example, in the case where the card is an integrated circuit (IC) card of non-contact type, when the IC card is approached to the card reader 18, for example, at a distance of 10 cm or less, the card reader 18 reads and records information from/on the IC card with an RFID (Radio Frequency Identification) type wireless communication.

The card that serves as a recording medium, is charged with electronic money in advance. The card includes a recording part, and the charged amount of electronic money and card information are recorded on the recording part. The recording part is implemented, for example, by a magnetic recording medium or a semiconductor memory. The card information shows possessor identification information for recognizing the possessor of the card. The electronic money is data produced by digitizing money. Charging the IC card or the like with electronic money means recording an available amount of electronic money on the IC card or the like. Hereinafter, charging is defined as collecting a charge or a deficit in electronic money from the electronic money recorded on the IC card. Further, refunding is defined as returning the electronic money corresponding to overcharged money to the IC card.

When it is detected that the card is placed over the card reader 18, the card reader 18 informs the charging processing unit 13 that the card is placed over the card reader 18. Further, when it is detected that the card is moved away from the card reader 18, the card reader 18 informs the charging processing unit 13 that the card is moved away from the card reader 18. The charging processing unit 13 sends information to the card reader 18 such that the card reader 18 writes the information received from the charging processing unit 13, and receives information read out by the card reader 18, from the card reader 18. Although the card reader 18 is implemented as a separate device from the printing apparatus 10, the card reader may be included in the printing apparatus 10.

The charging processing unit 13 performs charging or refunding by causing the card reader 18 to rewrite the amount of electronic money recorded on the card. Further, the charging is carried out by calculating the amount of money to be charged, based on predetermined print conditions (hereinafter, referred to as simply "print conditions"), reading out the amount of electronic money recorded on the card, subtracting the calculated amount of money from the read-out amount of money, and causing the card reader 18 to rewrite the amount of money, which is recorded on the card, into the subtracted amount of money. The print conditions are conditions prescribed by a print setup and attribute information on a print job, which are stored in the storage unit 17. The print setup includes information such as print designation, a paper size and the number of print copies. The attribute information of a print job includes information such as the number of print pages. Print designation is designating whether to print in monochrome or in color or whether to print in monochrome or in color in accordance with print data.

Further, when the charged amount of money is smaller than the amount of charge for the actual print result after charging, the charging processing unit 13 causes the card reader 18 to rewrite the amount of electronic money that is recorded on the card, for the amount of money corresponding to a difference and refunds the difference. Further, when the charged amount of money is larger than the amount of charge for the actual print result after charging, the charging processing unit causes the card reader 18 to rewrite the amount of electronic money that is recorded on the card, for the amount of money corresponding to a difference and charges the difference as an additional fee. Refunding and charging the additional fee is settlement.

The job control unit 14 that serves as a control unit carries out and manages a job from receiving the print job to finishing the print job and controls the I/O control unit 11, the UI control unit 12, the charging processing unit 13, the image generating unit 15, and the engine control unit 16. The job control unit 14 receives a print job from the client apparatus 20 connected to the network 40 or a mounted external storage device, from the I/O control unit 11. The job control unit 14 sends the print data included in the received print job to the image generating unit 15.

The image generating unit 15 analyzes the print data received from the job control unit 14, generates image data for printing in the engine unit 16A based on the print data, and sends the formed image data to the job control unit 14. The job control unit 14 sends the image data received from the image generating unit 15 to the engine control unit 16 and causes start of printing. The engine control unit 16 sends the image data received from the job control unit 14 to the engine unit 16A and controls an operation of the engine unit 16A. The engine unit 16A is implemented by an image forming device that forms an image on a print medium such as recording paper, based on the image data received from the engine control unit 16. The engine control unit 16 and the engine unit 16A serve as a printing unit.

The storage unit 17 that serving as a storage unit is implemented by a storage device, for example, a semiconductor memory, a hard disk drive or the like, and stores a program that is executed by the CPU, and information required for the CPU to execute the program. The information required for the CPU to execute the program includes the information on the print job, color-monochrome information showing whether each of the pages is color or monochrome, card information read out from the card, and information on the amount of money charged to the card, the amount of charge for the actual print result, and the difference between the amount of money charged to the card and the amount of charge for the actual print result. The information on the print job includes print data and attribute information. The card information read out from the card includes card information and the charged amount of electronic money.

The charging processing unit 13, the job control unit 14, the image generating unit 15, and the engine control unit 16 are functional components that are implemented by execution of a program stored in the storage unit 17 by the CPU. The charging processing unit 13, the job control unit 14, the image generating unit 15, and the engine control unit 16 can read out the information stored in the storage unit 17 and write information in the storage unit 17.

First, as an example, an example when a difference is generated between the amount of money charged to the card and the amount of charge for the actual print result, and the difference is refunded. For example, a print job A for total of five pages of three color pages and two monochrome pages is exemplified, assuming that the charge for one color page is 50 yen and the charge for one monochrome page is 10 yen. The amount of money for the print job A is 10 yen×5 pages=50 yen for printing of monochrome designation, 50 yen×5 pages=250 yen for printing of color designation, and 50 yen×3 pages+10 yen×2 pages=170 yen for printing of automatic color-monochrome designation that is an automatic color-monochrome mode. The monochrome designation is to designate printing in monochrome regardless of whether the pages corresponding to the print data are for color or monochrome. The color designation is to designate printing in color regardless of whether the pages corresponding to the print data are for color or monochrome. The automatic color-monochrome designation is to designate printing in color when the pages corresponding to the print data are for color and printing in monochrome when the pages corresponding to the print data are for monochrome.

Since the print result is monochrome even if printing is carried out in color when the page corresponding to the print data is for monochrome, the user suffers a loss of the difference between color and monochrome. Therefore, the user selects the automatic color-monochrome designation.

However, since whether the page to be printed is for color or monochrome is determined in a process of converting the print data into bitmap information for actual printing, that is, into the image data described above, the number of color pages and the number of monochrome pages are decided for the first time when conversion is applied to all of the pages, but the process takes a considerable time. Therefore, in order to quickly complete the printing, the printing apparatus 10 calculates and imposes the charge for color designation, in the automatic color-monochrome designation, and refunds the difference after printing.

Figure 3:
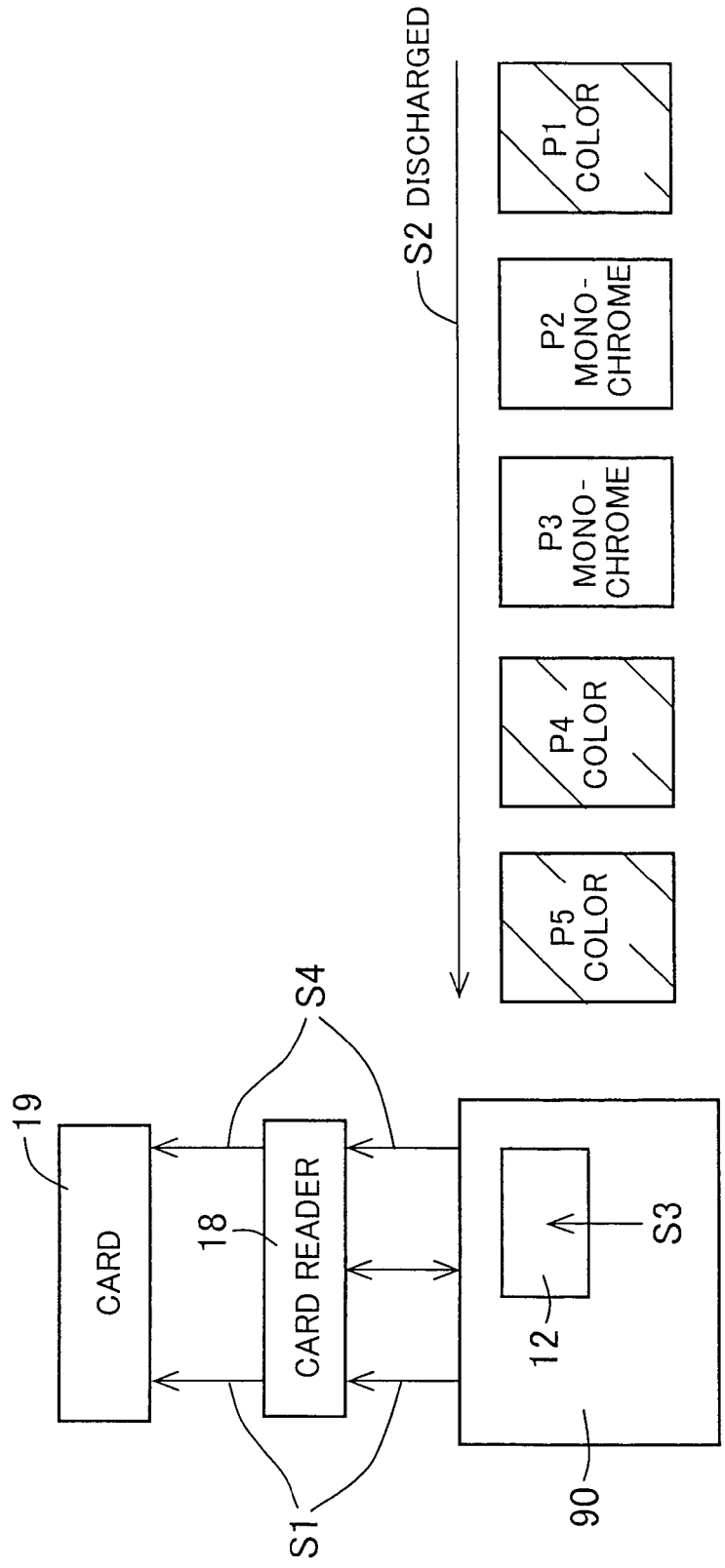
FIG. 3 is a view illustrating an example of a method of refunding a difference according to the related art.

FIG. 3 is a view illustrating an example of a method of refunding a difference according to the related art. A printing apparatus 90 according to the related art has the same configuration as the configuration shown in FIG. 2, and the description thereof is omitted to avoid repetition.

When performing the print job A in the automatic color-monochrome designation, the printing apparatus 90 calculates the amount of charge for printing in the color designation and charges the calculated amount of money, that is, 250 yen to the card 19 through the card reader 18, in sequence S1. In sequence S2, the printing apparatus 90 sequentially prints and discharges the first page to the fifth page (designated by "P1" to "P5" in the figure). At this time, since the first, fourth, and fifth pages are for colors and the second and third pages are for monochrome, the amount of charge for the print result from the actual printing is 170 yen. Therefore, it is necessary to refund 80 yen that is the difference from the pre-charged amount of money, 250 yen.

The printing apparatus 90 displays a message saying that there is a refund amount of money of 80 yen and requiring to place the card 19 over the card reader 18, on the UI controller 12, in sequence S3. In response to the display of the message, the user places the card 19 over the card reader 18, and when the card information stored in the placed card 19 matches the card information of the card 19 that is pre-charged, the printing apparatus 90 refunds the difference of 80 yen to the card 19 through the card reader 18 in sequence S4. However, when the user takes the copies without placing the card 19 over the card reader 18 in response to the display of the message, the difference is not refunded.

Figure 4:
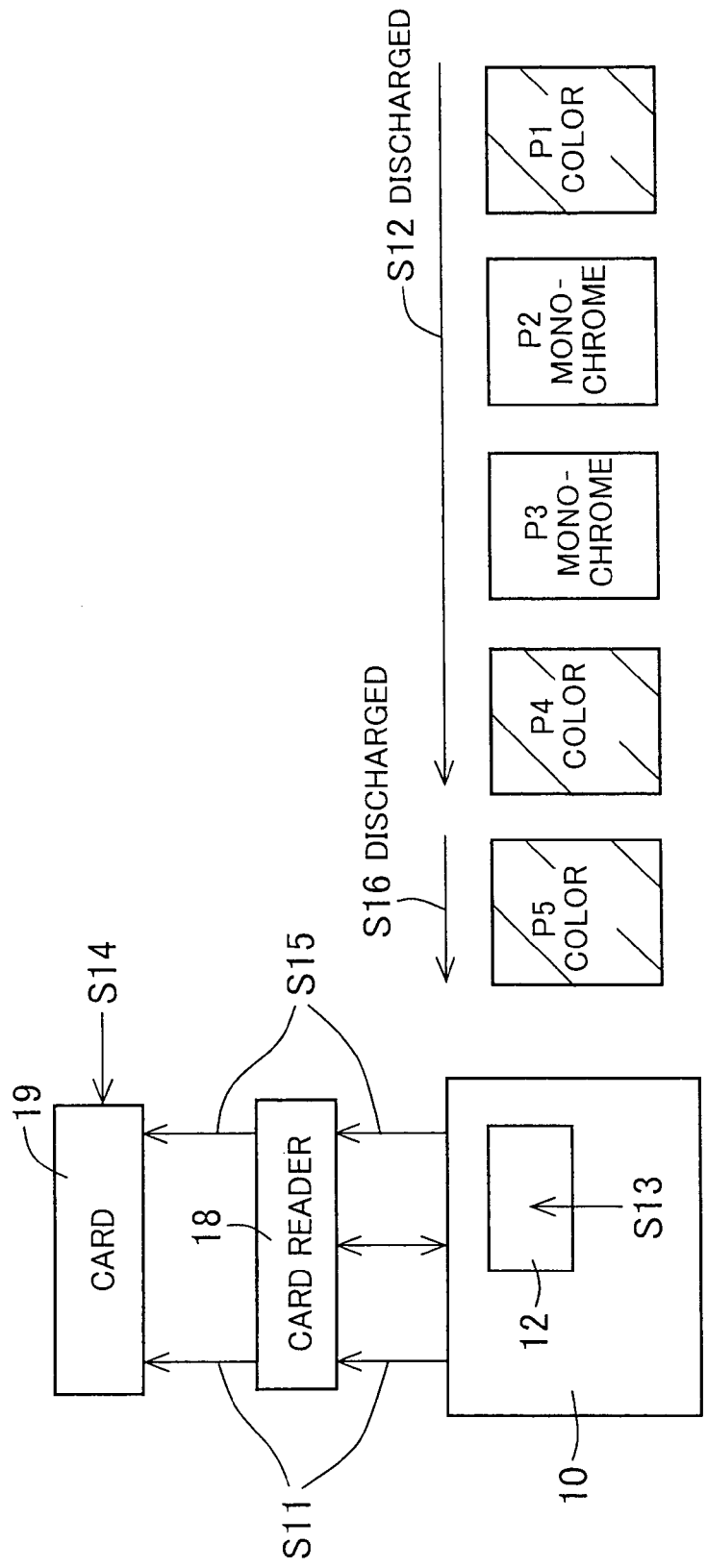
FIG. 4 is a view illustrating a method of refunding a difference by the printing apparatus.

FIG. 4 is a view illustrating a method of refunding a difference by the printing apparatus 10. Sequence S11 is the same as sequence S1 shown in FIG. 3, and the description thereof is omitted to avoid repetition.

In sequence S12, the printing apparatus 10 sequentially prints and discharges the first page to the fourth page. The printing apparatus 10 stops printing after forming image data for the fifth page and before printing the fifth page in sequence S13, and displays a message saying that there is a refund amount of money of 80 yen and requiring to place the card 19 over the card reader 18, on the UI control unit 12. At this time, since the first, fourth, and fifth pages are for color and the second and third pages are for monochrome, the amount of charge for the print result from the actual printing, is 170 yen. Therefore, it is necessary to refund 80 yen that is the difference from the pre-charged amount of money 250.

In response to the display of the message in sequence S13, in sequence S14, when the user places the card 19 over the card reader 18, in sequence 15, the printing apparatus 10 determines whether the card information recorded on the placed card 19 and the card information of pre-charged the card 19 match each other, and, when they match each other, then refunds the difference of 80 yen to the card 19 through the card reader 18. The printing apparatus 10 prints and discharges the final page, after refunding, in sequence S16.

In this case, since the final page is printed and discharged after the difference is refunded, the user cannot take the final page and refund oversight can be reduced, unless the user places the card 19 over the card reader 18 and the refund is carried out.

The printing apparatus 10 monitors whether the user places the card 19 over the card reader 18 for a predetermined time, in response to the display in sequence S13 after the display of the message in sequence S13. The predetermined time that is determined in advance can be set by the manager of the printing apparatus 10, and for example, set to three minutes. When the user does not place the card 19 over the card reader 18 within a predetermined time after the display in sequence S13, the difference is stored in the storage 17, as the refund amount of money, in association with the card information of the pre-charged card 19. Further, the print job in question is finished after the display of the message in sequence S13 is removed, and the next job can be received. When the user goes back with the copies of the four pages that are printed and discharged, without recognizing the display in sequence S13 and placing the card 19 over the card reader 18, the printed pages are two color pages and two monochrome pages, and the amount of charge for the print result from actual printing is 120 yen, and thus, the difference is 130 yen.

Further, after the display of the message in sequence S13, when another user places a card 19 over the card reader 18 within a predetermined time and the card information of the placed card 19 does not match the card information stored in the storage unit 17, the printing apparatus 10 stores the difference as the refund amount of money in the storage unit 17, in association with the card information of the pre-charged card 19. Further, after the display in sequence S13 is removed, the print job in question is finished and the print job corresponding to the user's card 19 placed over the card reader 18 is started.

With the difference, which cannot be refunded, stored in the storage unit 17 as the refund amount of money, when the card information recorded on the card 19 placed over the card reader 18 matches the card information that is stored in association with the refund amount of money stored in the storage unit 17, the amount of refund in question stored in the storage unit 17 is settled to the card 19 through the card reader 18, the amount of refund in question and the card information associated with the amount of refund in question are removed from the storage 17, and the print job corresponding to the cad 19 placed over the card reader 18 is newly started.

Further, the printing apparatus 10 may refund the refund amount of money stored in another printing apparatus 10. Specifically, when the card 19 is placed over the card reader 18 and the card information recorded on the card 19 is read out, the printing apparatus 10 transmits the read-out card information to another printing apparatus 10 through the I/O control unit 11. Hereinafter, the printing apparatus 10 that transmits the card information to another printing apparatus 10 is referred to as a printing apparatus X. The another printing apparatus 10 having received the card information determines whether there is card information that matches the received card information and is associated with the refund amount of money, in the storage unit 17 of the printing apparatus 10. When there is card information associated with the refund amount of money, the fact that the refund amount of money is present and the refund amount of money are transmitted to the printing apparatus X. Hereinafter, the printing apparatus 10 that has transmitted the fact that the refund amount of money is present and the refund amount of money to the printing apparatus X is referred to as a printing apparatus Y.

The printing apparatus X having received the fact that the refund amount of money is present and the refund amount of money displays a message saying that there is the refund amount of money that should be refunded, on the UI control unit 12, and requesting the card 19 to be placed over the card reader 18, on the UI control unit 12. When the user places the card 19 over the card reader 18 in response to the display of the message, the printing apparatus X determines whether the card information recorded on the placed card 19 matches the card information received from the printing apparatus Y, and, when they match each other, then refunds the refund amount of money received from the printing apparatus Y to the card 19 through the card reader 18. The printing apparatus X transmits completion of refund that shows that refund is completed, to the printing apparatus Y, after refunding. When receiving the completion of refund, the printing apparatus Y removes the refund amount of money stored in the storage unit 17 and the card information associated with the refund amount of money. The printing apparatus X newly starts the print job corresponding to the card 19 placed over the card reader 18, after refunding.

The printing apparatus X may transmit the card information of the placed card 19 only to some of the printing apparatus 10, not all of the printing apparatus 10 connected to the network 40. Specifically, each of the printing apparatuses 10 is provided with printing apparatus identification information to identify each of the printing apparatuses 10 and the printing apparatus identification information of each of the printing apparatuses 10 where the card information should be transmitted is set in each of the storage units 17 of the printing apparatuses 10, and each of the printing apparatuses 10 transmits the card information only to a printing apparatus 10 that is shown by the printing information identification information stored in the storage unit 17.

Further, the refund amount of money that should be refunded may be centrally managed by the server apparatus 30. When the refund amount of money that should be refunded is generated, the printing apparatus 10 does not store the refund amount of money in the storage unit 17 in association with the card information, but transmits the refund amount of money to the server apparatus 30, in association with the card information, through the I/O control unit 11. The server apparatus 30 stores the received refund amount of money and the associated card information, in association with each other, in a storage device (not shown) of the server apparatus 30.

When the card 19 is placed over the card reader 18 and the card information recorded on the card 19 is read out, the printing apparatus 10 transmits the read-out card information to the server apparatus 30 through the I/O control unit 11. Hereinafter, the printing apparatus 10 having transmitted the card information to the server apparatus 30 is referred to as a printing apparatus Z. The server apparatus 30 determines whether there is card information that matches the received card information and is associated with the refund amount of money in the storage device of the server apparatus 30. When there is card information associated with the refund amount of money, the fact that the refund amount of money is present and the refund amount of money are transmitted to the printing apparatus Z.

The printing apparatus Z receiving the fact that the refund amount of money is present and the refund amount of money displays a message saying that the refund amount of money that should be refunded is present and requiring the card 19 to be placed over the card reader 18, on the UI control unit 12. When the user places the card 19 over the card reader 18 in response to the display of the message, the printing apparatus Z determines whether the card information recorded on the placed card 19 matches the card information received from the server apparatus 30, and, when they match each other, then refund the refund amount of money received from the server apparatus 30 to the card 19 through the card reader 18. The printing apparatus Z transmits completion of the refund that shows that refund is completed, to the server apparatus 30, after refunding. When receiving the completion of refund, the server apparatus 30 removes the refund amount of money transmitted to the printing apparatus Z and the card information associated with the refund amount of money, among the refund amounts of money stored in the storage device and pieces of the card information. The printing apparatus Z newly starts the print job corresponding to the card 19 placed over the card reader 18, after refunding.

Figure 5:
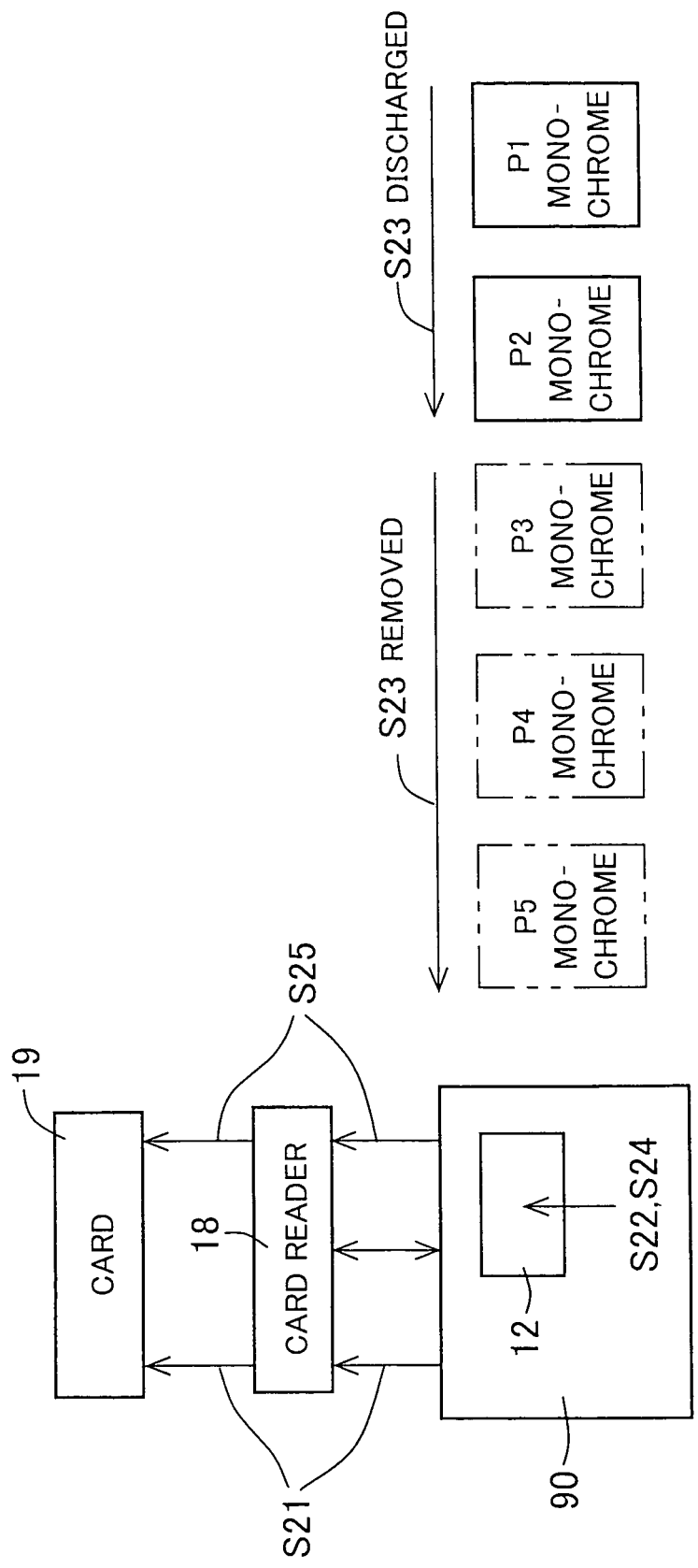
FIG. 5 is a view illustrating another example of a method of refunding a difference according to the related art.

FIG. 5 is a view illustrating another example of a method of refunding a difference according to the related art. This example is an example where a print job is canceled during the job or a print setup is changed. For example, a print job B for printing five pages in monochrome is exemplified, assuming that the charge for one monochrome page is 10 yen. In printing of monochrome designation, the amount of money for the print job B is 10 yen×5 pages=50 yen. When the print job is canceled during printing the second page, two pages have been printed in monochrome, so that the amount of charge for the print result from the actual printing is 20 yen.

When performing the print job B in the monochrome designation, the printing apparatus 90 calculates the amount of charge for printing of the monochrome designation and charges the calculated amount of money, that is, 50 yen to the card 19 through the card reader 18, in sequence S21. In sequence S22, the user cancels the print job during printing of the second page. Canceling the print job is carried out by operating an operation key for cancel displayed on the U/I control unit 12, for example.

When the print job is canceled during printing of the second page, in sequence S23, the printing apparatus 90 performs discharging up to two pages and removes the print data for the third and subsequent pages from the storage unit 17. Since the amount of charge for the print result from the actual printing is 20 yen, it is required to refund 30 yen that is the difference from the charged amount of money, 50 yen. In sequence S24, the printing apparatus 90 displays a message saying that the refund amount of money of 30 yen is present and requesting to place the card 19 over the card reader 18, on the UI control unit 12. When the user places the card 19 over the card reader 18 in response to the display of the message and the card information recorded on the placed card 19 matches the card information of the pre-charged card 19, the printing apparatus 90 refund the difference 30 yen to the card 19 through the card reader 18, in sequence S25. However, the difference is not refunded when the user takes the copies without placing the card 19 over the card reader 18 in response to the display of the message.

Figure 6:
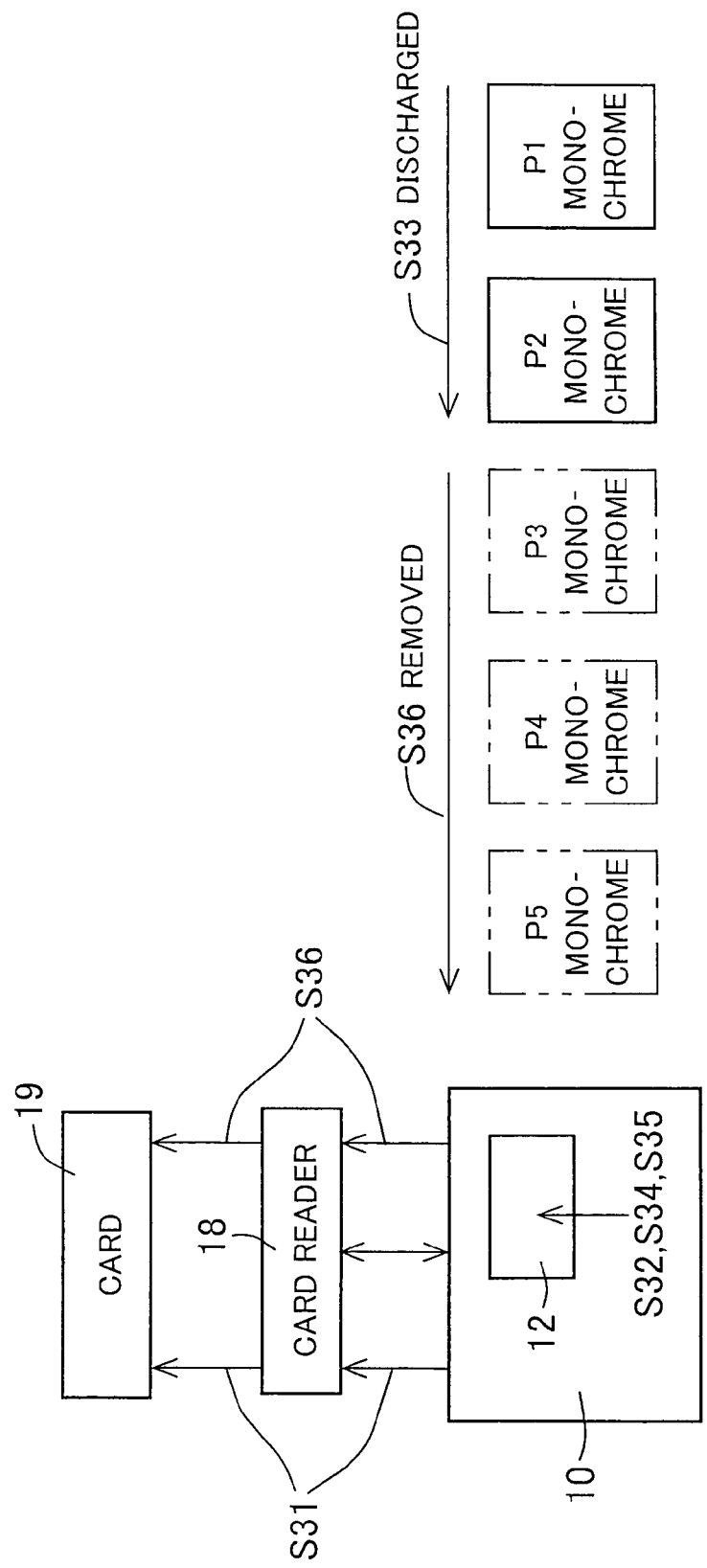
FIG. 6 is a view illustrating another example of a method of refunding a difference by the printing apparatus.

FIG. 6 is a view illustrating another example of a method of refunding a difference by the printing apparatus 10. Sequence S31 is the same as sequence S21 shown in FIG. 5, and the description thereof is omitted to avoid repetition. In sequence 32, the printing apparatus 10 displays a message saying "please place the card again to cancel the print job or change the print setup" on a display unit 12A of the UI control unit 12. When the user cancels the print job or changes the print setup, the printing apparatus 10 displays a cancel key for canceling the print job or a print setup change key for changing the print setup on the display unit 12A of the UI control unit 12 while the user keeps on placing the card 19 over the card reader 18. The user can cancel the print job by operating the cancel key or can change the print setup by operating the print setup change key. For example, when the user places the card 19 over the card reader 18 during printing of the second page, in sequence S33, the printing apparatus 90 performs printing, discharges up to the second page and stops printing.

In sequence S34, the printing apparatus 10 displays the cancel key and the print setup change key on the display unit 12A of the UI control unit 12 while the card 19 is kept placed over the card reader 18. In sequence S35, when the user operates the cancel key, in sequence S36, the printing apparatus 10 removes the print data for the third and subsequent pages from the storage unit 17 and refunds the refund amount of money of 30 yen to the card 19 through the card reader 18. When the card 19 is moved away from the card reader 18, without operating any one of the cancel key and the print setup change key, the printing apparatus 10 restarts the stopped print job.

In sequence S35, when the user operates the print setup change key, instead of the cancel key, the printing apparatus 10 displays a print setup change picture on the display unit 12A of the UI control unit 12. When the print setup is changed, the printing apparatus 10 calculates again the estimate amount of money that should be charged under print conditions according to the print setup after the changing, and displays a message requesting to place again the card 19 over the card reader 18 on the UI control unit 12. When the card 19 is placed over the card reader 18 in response to the display of the message, money is charged again by the re-calculated estimate amount of money and the stopped print job is restarted. The fact that the estimate amount of money is calculated under the assumption that all the pages are printed in color, and that pages printed in monochrome is generated is a first estimate-amount-of-money changing factor, and operating for changing the print setup is a second estimate-amount-of-money changing factor.

Figure 7:
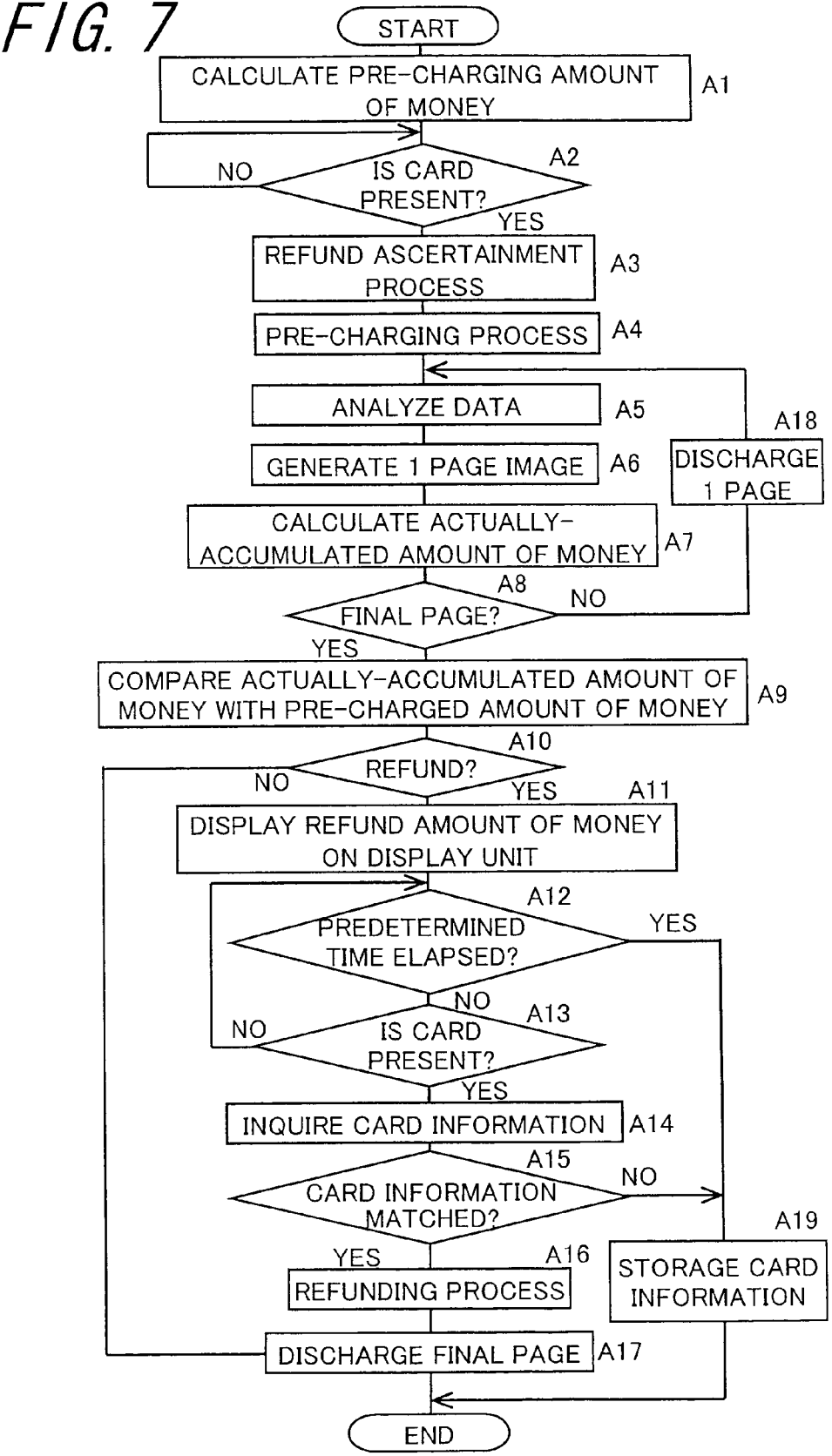
FIG. 7 is a flowchart showing the processing procedure in a first refunding process carried out by the printing apparatus.

FIG. 7 is a flowchart showing the processing procedure in a first refunding process carried out by the printing apparatus 10. When the job control unit 14 receives a print job from the I/O control unit 11, the procedure proceeds to step A1. Hereinafter, a complementary description is provided by exemplifying the print job A shown in FIG. 4.

In step A1, the job control unit 14 stores the received print job in the storage unit 17 and informs the charging processing unit 13 that the print job is received. When being informed by the job control unit 14 that the print job is received, the charging processing unit 13 calculates the amount of charge that should be charged (hereinafter, referred to as "the pre-charged amount of money") based on the print conditions. Specifically, the charging processing unit 13 calculates the pre-charged amount of money based on the number of print pages that is the attribute information of the print job, and the print designation set by the print setup. The print designation that is the print mode can be any one of monochrome designation, color designation, and automatic color-monochrome designation. For example, in the example of the print job A, since the number of print pages is five and the print designation is the automatic color-monochrome designation, the pre-charged amount of money is, 50 yen×5=250 yen.

In step A2, the charging processing unit 13 determines whether the card 19 is present. When the fact that the card 19 is placed over the card reader 18 is informed by the card reader 18, the charging processing unit 13 determines that there is the card 19, and the procedure proceeds to step A3. When being not informed by the card reader 18 that the card 19 is placed over the card reader 18, the charging processing unit 13 determines that there is no card 19, and the procedure returns to step A2 and waits for the card 19 to be placed over the card reader 18. When the card 19 is placed over the card reader 18, the card reader 18 reads out the card information recorded on the card 19 and sends the read-out card information to the charging processing unit 13. When determining that the card 19 is present, the charging processing unit 13 receives the card information from the card reader 18 and stores the received card information in the storage unit 17.

In step A3, the charging processing unit 13 performs a refund ascertainment process. The refund ascertainment process is a process that determines whether there is a refund amount of money that should be refunded for the placed card 19, and then refunds the money to the card 19 when there is a refund amount of money that should be refunded is present, and the detailed description is provided below.

In step A4, the charging processing unit 13 performs a pre-charging process. Specifically, the charging processing unit 13 instructs the card reader 19 to read out the amount of electronic money recorded on the card 19 to the card reader 18 and receives the amount of money read out by the card reader 18 from the card reader 18. Further, the pre-charged amount of money calculated in step A1 is subtracted from the received amount of money. Further, the charging processing unit 13 instructs the card reader 18 to make pre-charging by rewriting the amount of money recorded on the card 19 into the subtracted amount of money. The card reader 18 makes pre-charging by rewriting the amount of money recorded on the card 19 in the amount of money instructed by the charging processing unit 13. The charging processing unit 13 informs the job control unit 14 that the pre-charging is finished, when the pre-charging is finished.

In step A5, the job control unit 14 starts the print job when receiving the fact that the pre-charging is finished, from the charging processing unit 13. Specifically, the print data for the print job received from the I/O control unit 11 is sent to the image generating unit 15. The image generating unit 15 performs data analysis for the print data received from the job control unit 14. The print data is described by a print description language such as PCL or PDL. The image generating unit 15 performs a process of converting the print data into image data for actual printing, and in the process, determines whether one page to be printed is a color page or a monochrome page. The determination of whether a page is a color page or a monochrome page is called data analysis. The image data is bitmap information for actual printing.

In step A6, the image generating unit 15 generates image data for one page. The image generating unit 15 sends the generated image data for one page and the data analysis result, that is, the analysis result showing whether the page to be printed is a color page or a monochrome page, to the job control unit 14. The job control unit 14 sends the analysis result received from the image generating unit 15 to the charging processing unit 13.

In step A7, the charging processing unit 13 calculates the actually-accumulated amount of money. Specifically, the charging processing unit calculates the amount of charge for printing the pages relating to the analysis result in question and adds the calculated amount of money to the amount of money accumulated until then. The accumulated amount of money is the amount of money obtained by accumulating the amount of charge for printing the pages relating to the analysis result. For example, in the example of print job A, for the first page, the accumulated amount of money is 50 yen.

In step A8, the job control unit 14 determines whether it is the final page. When all of the pages corresponding to the print data for the print job that is being conducted are converted into image data by the image generating unit 15, the job control unit 14 determines that it is the final page, and the procedure proceeds to step A9. When all of the pages corresponding to the print data for the print job that is being conducted are not converted into image data by the image generating unit 15, the job control unit 14 determines that it is not the final page, and the procedure proceeds to step A18.

In step A9, the charging processing unit 13 compares the pre-charged amount of money calculated in step A1 with the accumulated amount of money. For example, in the example of print job A, since three pages are color and two pages are monochrome, the accumulated amount of money is 170 yen. Since the pre-charged amount of money is 250 yen, it is required to refund 80 yen. In step A10, the charging processing unit 13 determines whether there is a refund amount of money. When the pre-charged amount of money calculated in step A1 and the accumulated amount of money are different, the charging processing unit 13 determines that there is a refund amount of money, and the procedure proceeds to step A11. When the pre-charged amount of money calculated in step A1 and the accumulated amount of money match each other, the charging processing unit 13 determines that there is no refund amount of money, and the procedure proceeds to step A17. In the example of print job A, since the difference is 80 yen, it is determined that there is a refund amount of money, and the procedure proceeds to step A11.

When the pre-charged amount of money calculated in step A1 and the accumulated amount of money are different, the charging processing unit 13 subtracts the accumulated amount of money from the pre-charged amount of money calculated in step A1 and sets the subtracted result as the refund amount of money, and the procedure proceeds to step A11. Further, when the pre-charged amount of money calculated in step A1 and the accumulated amount of money match each other, the charging processing unit 13 informs the job control unit 14 that there is no need to refund.

In step A11, the charging processing unit 13 causes the UI control unit 12 (described as "display unit" in FIG. 7) to display the refund amount of money in order to inform the user that refunding is necessary. In step A12, the charging processing unit 13 determines whether a predetermined time has passed, after displaying the refund amount of money on the UI control unit 12. When the predetermined time has passed, the procedure proceeds to step A19, whereas when the predetermined time has not passed, the procedure proceeds to step A13. In step A13, the charging processing unit 13 determines whether the card 19 is present. When being informed that the card 19 is placed over the card reader 18, by the card reader 18, the charging processing unit 13 determines that the card 19 is present, and the procedure proceeds to step A14. When being not informed that the card 19 is placed over the card reader 18, by the card reader 18, the charging processing unit 13 determines that there is no card 19, and the procedure returns to step A12.

In step A14, the charging processing unit 13 receives the card information that the card reader 18 reads out from the card 19, through the card reader 18, and cross-checks the received card information. Specifically, the charging processing unit 13 compares the card information received from the card reader 18 with the card information stored in the storage unit 17, that is, the card information of the pre-charged card 19. In step A15, the charging processing unit 13 determines whether these pieces of the card information match each other. When the card information received from the card reader 18 and the card information stored in the storage unit 17, that is, the card information of the pre-charged card 19 match each other, the charging processing unit 13 determines that these pieces of the card information match each other, and the procedure proceeds to step A16. When the card information received from the card reader 18 and the card information stored in the storage unit 17, that is, the card information of the pre-charged card 19 do not match each other, the charging processing unit 13 determines that these pieces of the card information do not match each other, and the procedure proceeds to step A19.

In step A16, the charging processing unit 13 performs a refunding process. Specifically, the charging processing unit 13 instructs the card reader 18 to read out the amount of electronic money recorded on the card 19 and receives the amount of money read out by the card reader 18, from the card reader 18. Further, the charging processing unit 13 adds the refund amount of money calculated in step A10 to the received amount of money and instructs the card reader 18 to refund the money by rewriting the amount of money recorded on the card 19 into the added amount of money. The card reader 18 performs the refunding process by rewriting the amount of money recorded on the card 19 into the amount of money instructed by the charging processing unit 13. The charging processing unit 13 informs the job control unit 14 that the refunding process is finished, when the refunding process is finished.

In step A17, when being informed that refunding is not required or refunding is finished, by the charging processing unit 13, the job control unit 14 sends the image data for the final page received from the image generating unit 15 to the engine control unit 16. The engine control unit 16 sends the image data for the final page received from the job control unit 14 to the engine unit 16A, performs printing, and discharges the final page printed after printing. The job control unit 14 finishes the first refunding process when being informed that discharging is finished, by the engine control unit 16.

In step A18, the job control unit 14 sends image data for one page received from the image generating unit 15 to the engine control unit 16. The engine control unit 16 sends the image data for one page received from the job control unit 14 to the engine unit 16A, performs printing, and discharges the printed page after printing. When the job control unit 14 is informed that discharging is finished, by the engine control unit 16, the procedure returns to step A6 and steps A6 to A8 are repeated for every page, until it is the final page.

In step A19, the job control unit 14 finishes the first refunding process by performing a card information storage process. The card information storage process is a process of storing the information such as the card information and the refund amount of money, in the storage unit 17, and the detailed description is provided below. After the first refunding process is finished, when the job control unit 14 receives a new print job from the I/O control unit 11, the procedure proceeds to step A1.

Figure 8:
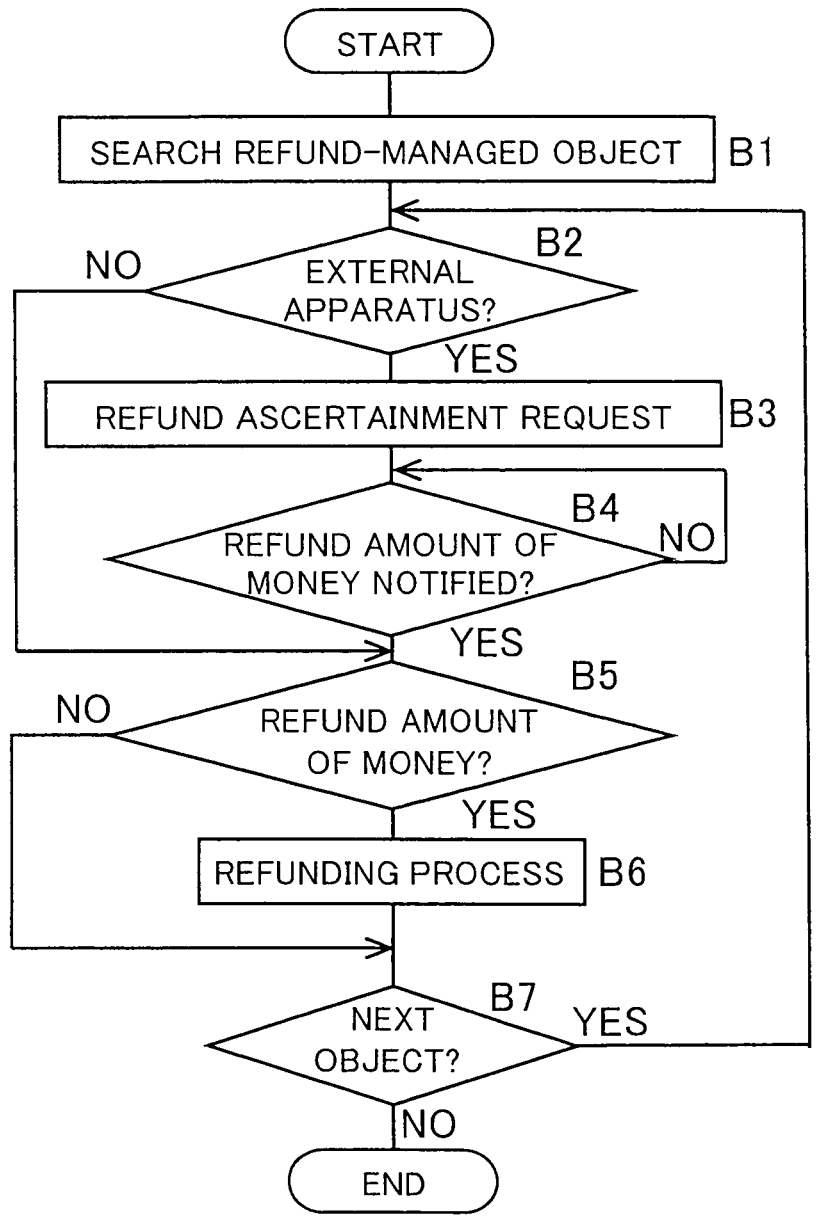
FIG. 8 is a flowchart showing the processing procedure in a refund ascertainment process carried out by the printing apparatus.

FIG. 8 is a flowchart showing the processing procedure in the refund ascertainment process carried out by the printing apparatus 10. When step A3 shown in FIG. 7 is carried out, the procedure proceeds to step B1. The refund ascertainment process is a process of ascertaining whether there is a refund amount of money that should be refunded to the user is present and performing refunding when there is a refund amount of money that should be refunded is present.

In step B1, the charging processing unit 13 searches refund-managed objects. Specifically, refund-managed objects registered in the storage unit 17 are searched. The refund-managed objects are registered in the storage unit 17 in advance by a manager. When the printing system 1 is implemented by only one printing apparatus 10, the refund-managed object is only the printing apparatus 10 itself. When the printing system 1 includes a plurality of printing apparatuses 10 and the printing apparatuses 10 each store the refund amount of money that should be refunded and the card information of the card 19 where the refund amount of money should be refunded, the refund-managed objects are the printing apparatus 10 itself and another printing apparatus 10. When the printing system 1 includes a plurality of printing apparatuses 10 and the server apparatus 30 and the server apparatus 30 centrally manages the refund amount of money that should be refunded and the card information of the card 19 where the refund amount of money should be refunded, the refund-managed object is the server apparatus 30. Hereinafter, another printing apparatus 10 and the server apparatus 30 are considered as an external apparatus.

In step B2, the charging processing unit 13 determines whether it is an external apparatus. In the charging processing unit 13, the procedure proceeds to step B3 when an apparatus registered as a refund-managed object in the storage unit 17 is an external apparatus, and the procedure proceeds to step B5 when an apparatus registered as a refund-managed object in the storage unit 17 is not an external apparatus.

In step B3, the charging processing unit 13 transmits a refund ascertainment request to the external apparatus. Specifically, the charging processing unit 13 requests the job control unit 14 to transmit the refund ascertainment request to the external apparatus. The refund ascertainment request is an order to request a reply for the notification of the refund amount of money, when storing the refund amount of money that should be refunded and the card information of the card 19 where the refund amount of money should be refunded. The notification of the refund amount of money includes the fact that the refund amount of money that should refunded is stored, the refund amount of money, and the card information of the card 19 where the refund amount of money should be refunded. The job control unit 14 instructs the I/O control unit 11 to transmit the refund ascertainment request to the external apparatus, when requesting that the refund ascertainment request is transmitted from the charging processing unit 13 to the external apparatus. The I/O control unit 11 receiving the instruction by the job control unit 14 transmits the refund ascertainment request to the instructed another printing apparatus 10 or server apparatus 30.

In step B4, the charging processing unit 13 determines whether there is a notification of the refund amount of money. When the I/O control unit 11 receives the notification of the refund amount of money from the external apparatus and sends the received notification of the refund amount of money to the job control unit 14, the job control unit 14 sends the notification of the refund amount of amount received from the I/O control unit 11 to the charging processing unit 13, and the charging processing unit 13 receives the notification of the refund amount of money from the job control unit 14, the charging processing unit 13 determines that there is a notification of the refund amount of money, and the procedure proceeds to step B5. When the I/O control unit 11 fails to receive the notification of the refund amount of money from the external apparatus and the charging processing unit 13 correspondingly fails to receive the notification of the refund amount of money from the job controller 14, the charging processing unit 13 determines that there is no notification of the refund amount of money, and the procedure returns to step B4.

In step B5, the charging processing unit 13 determines whether there is a refund amount of money. Specifically, in the determination in step B2, in the case where the apparatus registered as a refund-managed object in the storage unit 17 is not an external apparatus, when the refund amount of money that should be refunded and the card information of the card 19 where the refund amount of money should be refunded are stored in the storage unit 17 and the card information in question matches the card information received from the card reader 18 in step A2 shown in FIG. 7, the charging processing unit 13 determines that there is a refund amount of money, and the procedure proceeds to step B6. When the refund amount of money that should be refunded and the card information of the card 19 where the refund amount of money should be refunded are stored in the storage unit 17 and the card information in question does not match the card information received from the card reader 18 in step A2 shown in FIG. 7, or when the refund amount of money that should be refunded and the card information of the card 19 where the refund amount of money should be refunded are not stored in the storage unit 17, the charging processing unit 13 determines that there is no refund amount of money, and the procedure proceeds to step B7.

Further, in step B5, in the case where there is notification of the refund amount of money in the determination of step B4, when the refund amount of money is not "0", the charging processing unit 13 determines that the refund amount of money is present, and the procedure proceeds to step B6. When the refund amount of money is "0", the charging processing unit 13 determines that there is no refund amount of money, and the procedure proceeds to step B7.

In step B6, the charging processing unit 13 performs the refunding process. Specifically, the charging processing unit 13 instructs the card reader 18 to read out the amount of electronic money recorded on the card 19 and receives the amount of money read out by the card reader 18, from the card reader 18. Further, when the apparatus registered as a refund-managed object in the storage unit 17 is not an external apparatus in the determination of step B2, the charging processing unit 13 adds the refund amount of money stored in the storage unit 17 to the received amount of money, and when there is notification of the refund amount of money in the determination of step B4, the charging processing unit 13 adds the refund amount of money included in the notification of the refund amount of money to the received amount of money. Further, the charging processing unit 13 instructs the card reader 18 to refund by rewriting the amount of money recorded on the card 19 into the added amount of money. The card reader 18 performs refund the money by rewriting the amount of money recorded on the card 19 into the amount of money instructed by the charging processing unit 13.

In step B7, the charging processing unit 13 determines whether the next refund-managed object is present. When the next apparatus that is registered as a refund-managed object is present in the storage unit 17, the charging processing unit 13 determines that the next refund-managed object is present, and the procedure returns to step B2. When no next apparatus registered as a refund-managed object is present in the storage unit 17, the charging processing unit 13 determines that no next refund-managed object is present, and finishes the refund ascertainment process.

Figure 9:
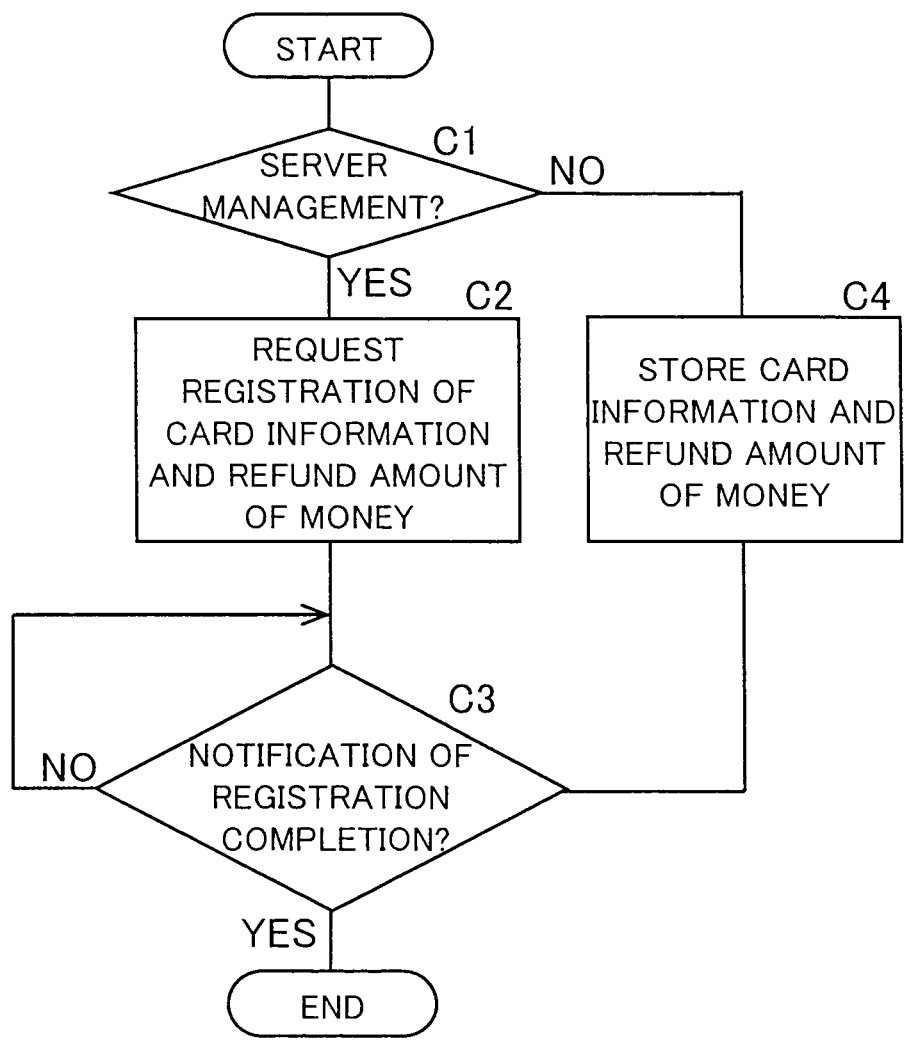
FIG. 9 is a flowchart showing the processing procedure in a card information storage process carried out by the printing apparatus.

FIG. 9 is a flowchart showing the processing procedure in the card information storage process carried out by the printing apparatus 10. When step A19 shown in FIG. 7 is carried out, the procedure proceeds to step C1. The card information storage process is a process of storing the refund amount of money when the user does not performs the refunding process and the refund amount of money remains in the printing apparatus 10 and a process that is carried out such that the subsequent job can be carried out.

In step C1, the charging processing unit 13 determines whether there is a server management. The server management means that the server apparatus 30 centrally manages the refund amount of money that should be refunded and the card information of the card 19 where the refund amount of money should be refunded. When there is no server management, management by the server apparatus 30 is not carried out, the printing apparatuses 10 each manage the refund amount of money that should be refunded and the card information of the card 19 where the refund amount of money should be refunded. Whether or not there is a server management is stored in the storage unit 17 in advance by the manager. When the fact that there is a server management is stored in the storage unit 17, the charging processing unit 13 determines that there is a server management, and the procedure proceeds to step C2, whereas when the fact that there is a server management is not stored in the storage unit 17, the charging processing unit 13 determines that there is no server management, and the procedure proceeds to step C4.

In step C2, the charging processing unit 13 requests the server apparatus 30 to register the card information and the refund amount of money. Specifically, the charging processing unit 13 sends the card information and the refund amount of money to the job control unit 14 and requests transmitting a refund registration request for registering the sent card information and the refund amount of money to the server apparatus 30. The card information is the card information received from the card reader 18 in step A2 shown in FIG. 7 and the refund amount of money is the refund amount of money calculated in step A9 shown in FIG. 7. The refund registration request is an order that requests registration of the card information and the refund amount of money that are transmitted together with the refund registration request.

The job control unit 14 instructs the I/O control unit 11 to transmit the refund registration request to the server apparatus 30, together with the card information and the refund amount of money received from the charging processing unit 13, when being requested to transmit the refund registration request from the charging processing unit 13 to the server apparatus 30. The I/O control unit 11 having received the instruction by the job control unit 14 transmits the card information and the refund amount of money, and the refund registration request to the server apparatus 30. When receiving the card information and the refund amount of money, and the refund registration request from the printing apparatus 10, the server apparatus 30 stores the received card information and refund amount of money, in association with the storage device of the server apparatus 30, and transmits notification of registration completion to the printing apparatus 10 having transmitted the refund registration request. The notification of registration completion is notification that informs that registration is completed by storing the received card information and the refund amount of money in the storage device of the server apparatus 30.

In step C3, the charging processing unit 13 determines whether the notification of registration completion is received. When the I/O control unit 11 receives the notification of registration completion from the server apparatus 30 and sends the received notification of registration completion to the job control unit 14, the job control unit 14 sends the notification of registration completion received from the I/O control unit 11 to the charging processing unit 13. When the charging processing unit 13 receives the notification of registration completion from the job control unit 14, the charging processing unit 13 determines that there is notification of registration completion and finishes the card information storage process. When the I/O control unit 11 fails to receive the notification of registration completion from the server apparatus 30 and the charging processing unit 13 correspondingly fails to receive the notification of registration completion from the job control unit 14, the charging processing unit 13 determines there is no notification of registration completion, and the procedure returns to step C3.

In step C4, the charging processing unit 13 stores the card information and the refund amount of money in the storage unit 17, and then finishes the card information storage process. The card information is the card information received from the card reader 18 in step A2 shown in FIG. 7 and the refund amount of money is the refund amount of money calculated in step A9 shown in FIG. 7.

Figure 10:
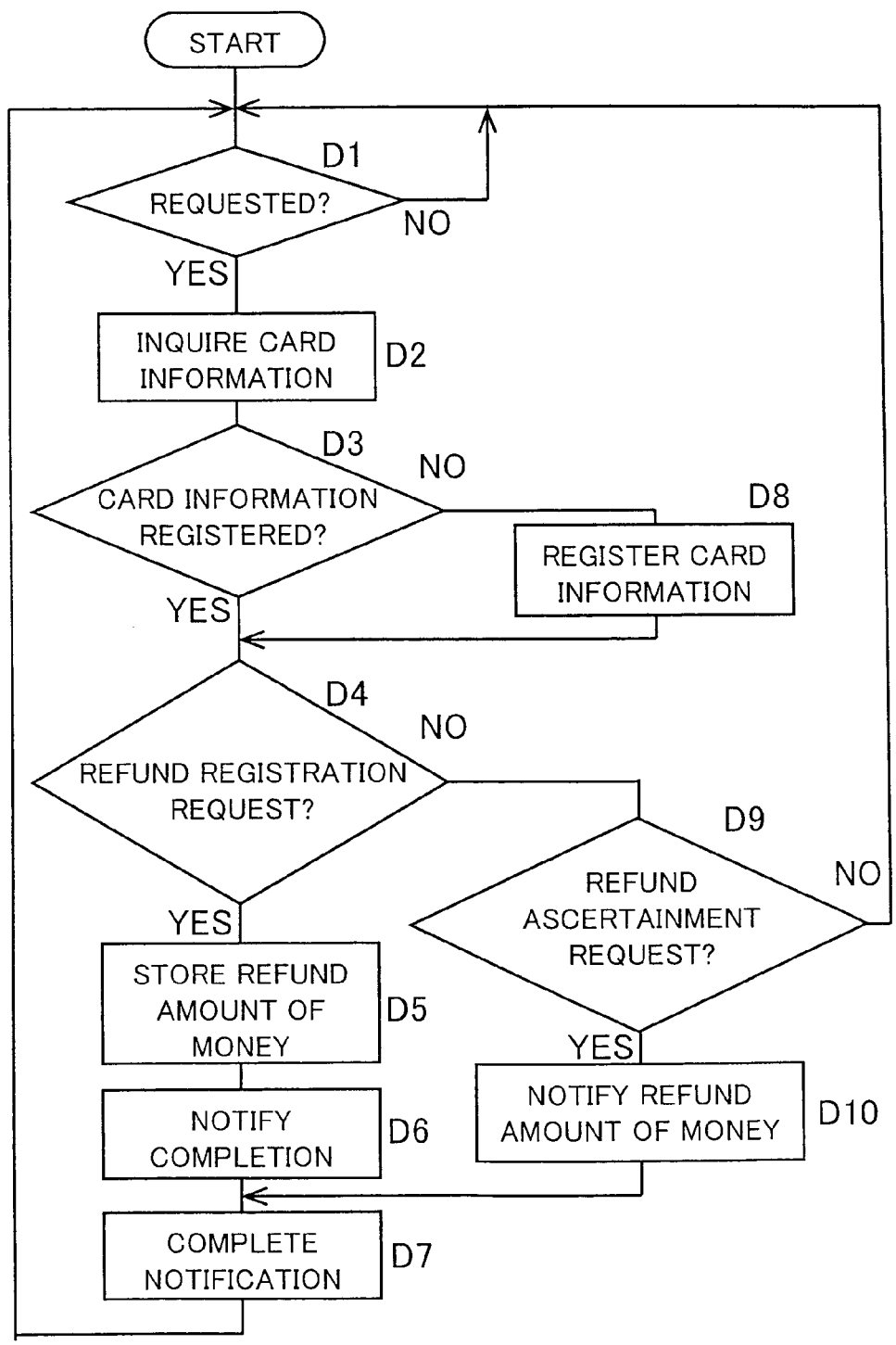
FIG. 10 is a flowchart showing the processing procedure in a registration refunding process carried out by the printing apparatus or the server apparatus.

FIG. 10 is a flowchart showing the processing procedure in a registration refunding process carried out by the printing apparatus 10 or the server apparatus 30. When the printing apparatus 10 is supplied with power and comes to be in an operable state, the procedure proceeds to step D1. Alternatively, when the server apparatus 30 is supplied with power and comes to be in an operable state, the procedure proceeds to step D1. The case of the server apparatus 30 will be described first. The registration refunding process carried out by the server apparatus 30 is an example where the server apparatus 30 centrally manages the refund amount of money and the card information.

In step D1, the server apparatus 30 determines whether there is a request. The request is the request from the printing apparatus 10, and for example, the request such as the refund registration request and the refund ascertainment request. Step D1 is in a request standby state. The server apparatus 30 determines that there is a request when receiving a request from the printing apparatus 10, and the procedure proceeds to step D2, and the sever apparatus 30 determines that there is no request when failing to receive a request from the printing apparatus 10, and the procedure returns to step D1.

In step D2, the server apparatus 30 inquires card information. Specifically, the server apparatus 30 inquires whether the card information received together with the request is stored in the storage device of the server apparatus 30. In step D3, the server apparatus 30 determines whether the card information is registered. When the card information received together with the request is registered in the storage device of the server apparatus 30, the procedure proceeds to step D4, and when the card information received together with the request is not registered in the storage device of the server apparatus 30, the procedure proceeds to step D8.

In step D4, the server apparatus 30 determines whether there is the refund registration request. When the request received in step D1 is the refund registration request, the procedure proceeds to step D5, and when the request received in step D1 is not the refund registration request, the procedure proceeds to step D9. In step D5, the server apparatus 30 stores and registers, in the storage device thereof, the refund amount of money received together with the refund registration request, in association with the card information received together with the refund registration request. In step D6, the server apparatus 30 notifies completion. Specifically, the server apparatus 30 transmits notification of registration completion to the printing apparatus 10 having transmitted the request received in step D1. In step D7, the server apparatus 30 completes the notification and returns to the request standby state in step D1.

In step D8, the server apparatus 30 registers the card information received together with the request to the storage device of the server apparatus 30, and the procedure proceeds to step D4. In step D9, the server apparatus 30 determines whether there is the refund ascertainment request. When the request received in step D1 is the refund ascertainment request, the procedure proceeds to step D10, and when the request received in step D1 is not the refund ascertainment request, the procedure returns to step D1.

In step D10, when the card information received together with the request matches the card information that is stored in the storage device in association with the refund amount of money, the server apparatus 30 transmits the refund amount of money stored in the storage device to the printing apparatus 10 having transmitted the request received in step D1, and the procedure proceeds to step D7. When the card information received together with the request does not match the card information that is stored in the storage device in association with the refund amount of money, the sever apparatus 30 transmits the refund amount of money of 0 to the printing apparatus 10 having transmitted the request received in step D1, and the procedure proceeds to step D7.

Next, the case of the printing apparatus 10 will be described. The registration refunding process carried out by the printing apparatus 10 is an example where the printing apparatuses 10 each manage the refund amount of money generated in the printing apparatuses 10 itself and the card information and enable to refund the money to the card 19 when the card 19 where the card information is recorded is placed over another printing apparatus. In the printing apparatus 10, steps D2 to D6, and D8 are not processed. That is, step D9 follows step D1 and step D7 follows step 10.

In step D1, the charging processing unit 13 determines whether there is a request. When the I/O control unit 11 receives a request from another printing apparatus 10 and the charging processing unit 13 is informed that the request is received, by the job control unit 14, the charging processing unit 13 determines that there is a request, and the procedure proceeds to step D9. When the I/O control unit 11 fails to receive a request from another printing apparatus 10 and the charging processing unit 13 is not informed that the request is received, by the job control unit 14, the charging processing unit 13 determines that there is no request, and the procedure returns to step D1. When the I/O control unit 11 receives a request from another printing apparatus 10, the card information received together with the request is sent to the charging processing unit 13 through the job control unit 14.

In step D9, the charging processing unit 13 determines whether there is the refund ascertainment request. When the request received in step D1 is the refund ascertainment request, the procedure proceeds to step D10, and when the request received in step D1 is not the refund ascertainment request, the procedure returns to step D1.

In step D10, when the card information received together with the request matches the card information that is stored in the storage unit 17 in association with the refund amount of money, the charging processing unit 13 transmits the refund amount of money stored in the storage unit 17 to another printing apparatus 10 having transmitted the request received in step D1, and the procedure proceeds to step D7. When the card information received together with the request does not match the card information that is stored in the storage unit 17 in association with the refund amount of money, the charging processing unit 13 transmits the refund amount of money of 0 to another printing apparatus 10 having transmitted the request received in step D1, and the procedure proceeds to step D7. In step D7, the charging processing unit 13 completes notification and returns to the request standby state in step D1.

Figure 11A:
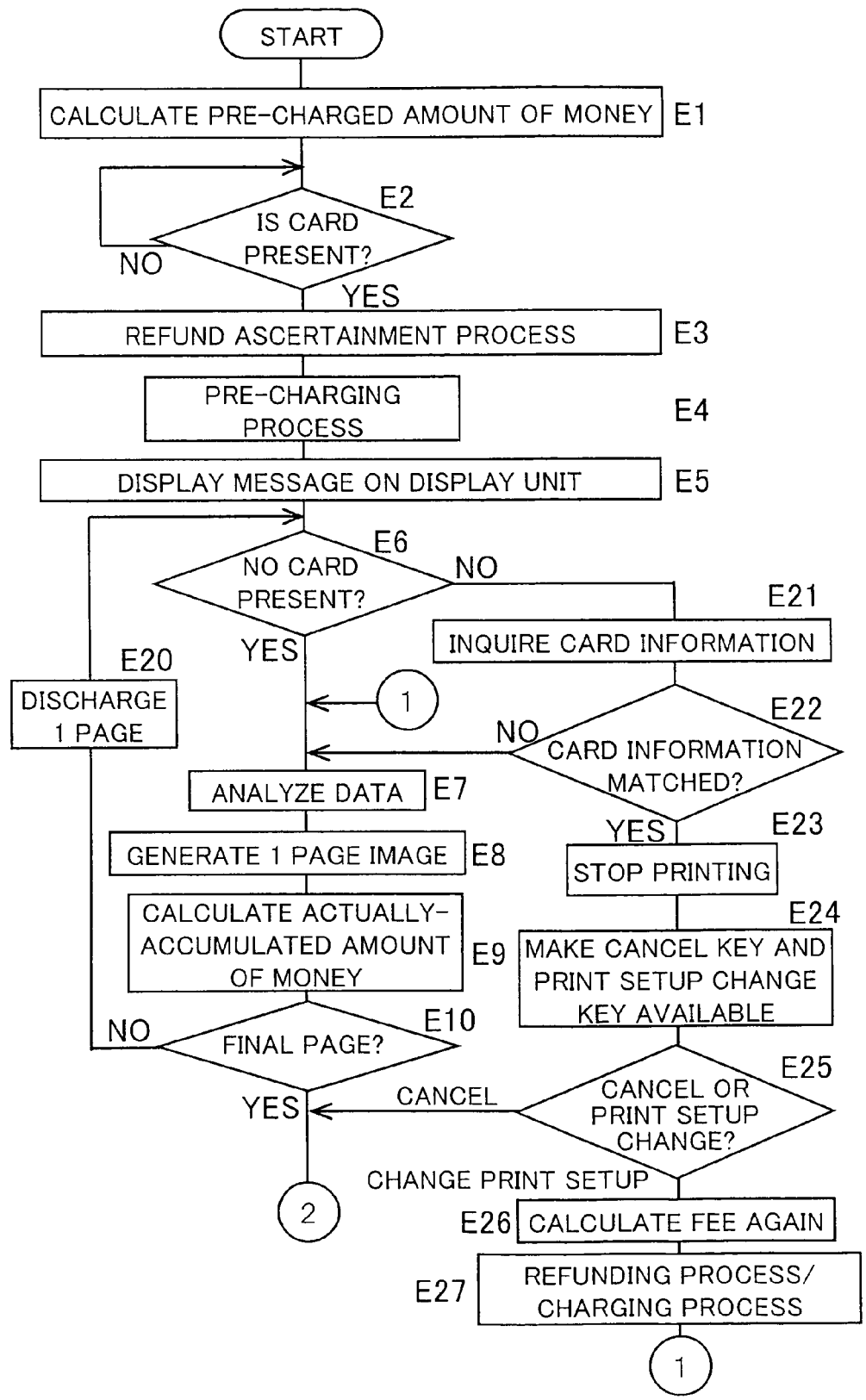
FIG. 11A and FIG. 11B are flowcharts showing the processing procedure in a difference refunding process carried out by the printing apparatus.
Figure 11B:
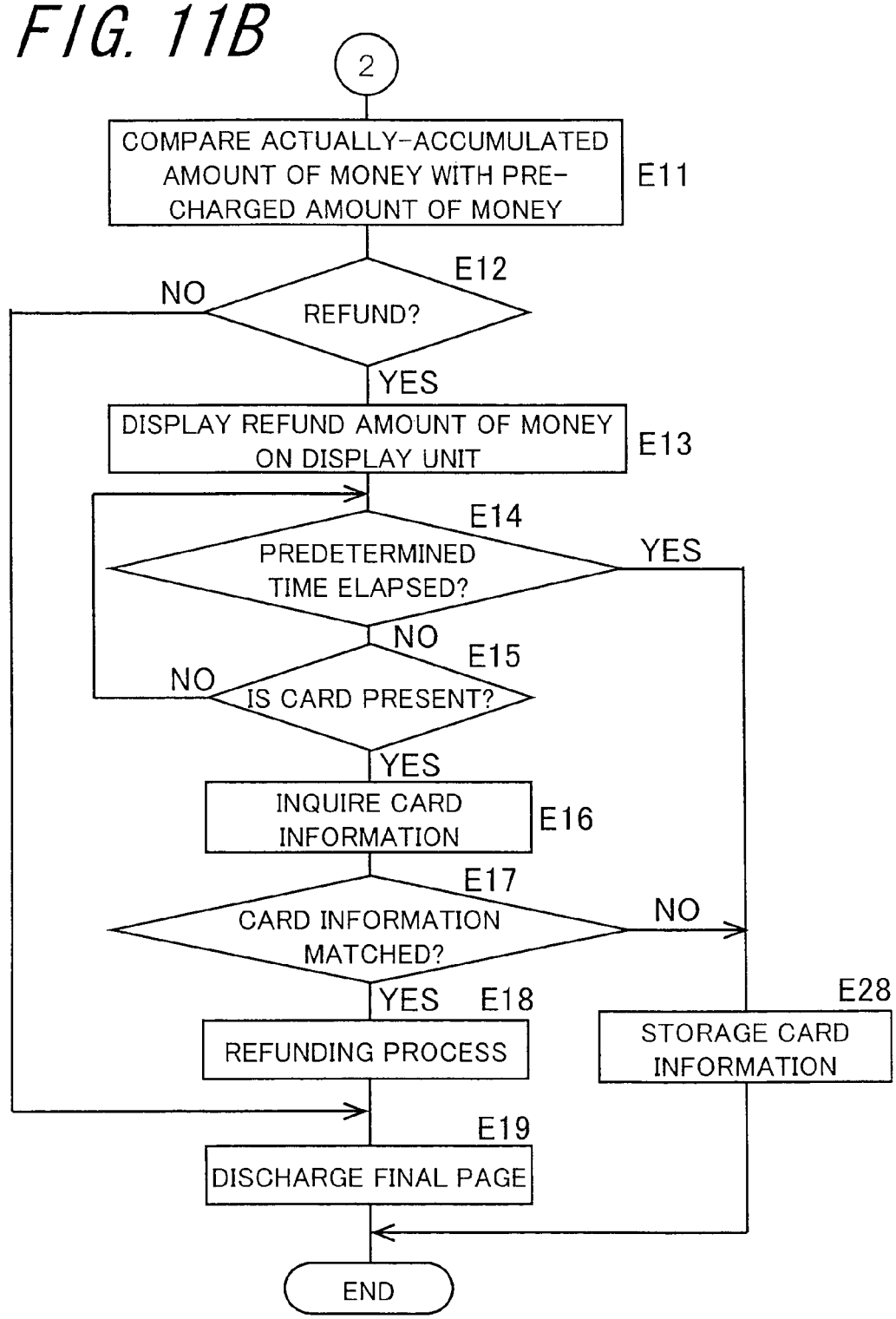

FIG. 11A and FIG. 11B are flowcharts showing the processing procedure in a difference refunding process carried out by the printing apparatus 10. The difference refunding process is a process of refunding the difference due to a user operation. The user operation includes an operation of canceling a print job by a user's instruction and an operation of changing the print setup by a user's instruction. Changing the print setup relating to charging includes changing print designation, changing the paper size, and changing the number of printed pages. Changing the print designation is changing the monochrome designation into the color designation while a print job is carried out, for example.

Steps E1 to E4, E7 to E19, and E28 are the same as steps A1 to A17, and A19 shown in FIG. 7, and the detailed description thereof is omitted to avoid repetition. Hereinafter, the description is supplemented by the example of print job B shown in FIG. 6. In the example of print job B, in step E1, the number of print pages is five and the print designation is the monochrome designation, so that the pre-charged amount of money is, 10 yen×5=50 yen.

In step E5, the charging processing unit 13 causes the display unit 12A of the UI control unit 12 to display a message saying "please place the card again to cancel the job or change the print setup". In step E6, the charging processing unit 13 determines whether there is no card 19. When it is not informed that the card 19 is placed over the card reader 18, by the card reader 18, the charging processing unit 13 determines that there is no card 19, and the procedure proceeds to step E7. When it is not informed that the card 19 is placed over the card reader 18, by the card reader 18, the charging processing unit 13 determines that the card 19 is present, and the procedure proceeds to step E21. In the example of print job B, the card 19 is placed over the card reader 18 before data analysis for the third page after printing the second page is started, and the procedure proceeds to step E21.

The message saying "please place the card again to cancel the job or change the print setup" implies that it is possible to stop printing by contacting or approaching the card to the card reader 18, or that it is possible to change the predetermined print conditions by contacting or approaching the card to the card reader 18.

In step E20, the job control unit 14 sends image data for one page received from the image generating unit 15 to the engine control unit 16. The engine control unit 16 sends the image data for one page received from the engine control unit 14 to the engine unit 16A, and causes the engine unit 16 A to perform printing and to discharge the printed page after printing. When the job control unit 14 is informed that discharging is finished, by the engine control unit 16, the procedure returns to step E6 and steps E6 to E10 are repeated for every page, until the final page, if the job is not canceled.

In step E21, the charging processing unit 13 inquires card information. Specifically, the charging processing unit 13 searches whether the card information received from the card reader 18 is stored in the storage unit 17. In step E22, the charging processing unit 13 determines whether pieces of the card information match each other. When the card information received from the card reader 18 matches any card information stored in the storage unit 17, the charging processing unit 13 determines that pieces of the card information match each other and sends the fact that the card 19 is placed, to the job control unit 14, and the procedure proceeds to step E23.

When the card information received from the card reader 18 does not match any card information stored in the storage unit 17, the charging processing unit 13 determines that pieces of the card information do not match each other, and the procedure proceeds to step E7.

In step E23, the job control unit 14 stops printing. Specifically, the job control unit 14 stops controlling the image generating unit 15 and the engine control unit 16, when receiving the fact that the card 19 is placed, from the charging processing unit 13. In step E24, the charging processing unit 13 makes a cancel key and a print setup change key available. Specifically, the charging processing unit 13 causes the display unit 12A of the UI control unit 12 to display the cancel key and the print setup change key so that the cancel key and the print setup change key can be operated.

In the embodiment, although the cancel key and the print setup change key are displayed on the display unit 12A of the UI control unit 12 by placing the card, the cancel key and the print setup change key may be kept displayed on the display unit 12A of the UI control unit 12. In this case, whether the cancel key and the print setup change key can be operated is displayed, by changing the brightness of displaying the cancel key and the print setup change key. For example, when the cancel key and the print setup change key are brightly displayed, the operation is possible, whereas when cancel key and the print setup change key are darkly displayed, the operation is not possible. That is, when the message saying "please place the card again over to cancel the print job or change the print setup" is displayed on the display unit 12A of the UI control unit 12, the cancel key and the print setup change key are darkly displayed, and when the card is placed, the cancel key and the print setup change key are brightly displayed.

In step E25, the charging processing unit 13 determines whether the user's operation is "cancel" or "print setup change". When there is notification of the position contacted on a touch sensor from the UI control unit 12 and the contact position is the position where the cancel key is displayed, the charging processing unit 13 determines that the user's operation is "cancel", and the procedure proceeds to step E11. When there is notification of the position contacted on a touch sensor from the UI control unit 12 and the contact position is the position where the print setup change key is displayed, the charging processing unit 13 determines that the user's operation is "print setup change", and the procedure proceeds to step E26. The cancel key is ascertainment information. The information shows the position where the print setup change key is displayed and the position contacted to the touch sensor is print stop information.

In step E26, the charging processing unit 13 calculates again the amount of charge for the print result, under the print conditions according to the print setup after changing, after the print setup is changed. In step E27, the charging processing unit 13 performs the refunding process or the charging process, and the procedure proceeds to step E7. Specifically, when the amount of money that is calculated again is smaller than the amount of money charged in advance to the card 19, the refunding process is carried out to refund a difference as a refund amount of money. The difference is the amount of money obtained by subtracting the accumulated amount of money from the pre-charged amount of money. The refunding process is the same as step E18, that is, the process in step A16 shown in FIG. 7. In the example of print job B, since three pages are canceled and two pages are printed, the accumulated amount of money is 20 yen. Since the accumulated amount of money of 20 yen, is smaller than the pre-charged amount of money of 50 yen, the difference of 30 yen is the refund amount of money and 30 yen is refunded.

When the amount of money that is calculated again is larger than the amount of money charged in advance to the card 19, the difference is charged as an additional fee. In the charging process, the charging processing unit 13 instructs the card reader 18 to read out the amount of electronic money recorded on the card 19 and receives the amount of money read out by the card reader 18, from the card reader 18. Further, the card reader 18 is instructed to charge the additional fee to the card reader 18 by subtracting the amount of additional fee from the received amount of money and rewriting the amount of money recorded on the card 19 into the subtracted amount of money. The card reader 18 rewrites the amount of money recorded on the card 19 into the amount of money instructed by the charging processing unit 13 to performing charging of the additional fee. When the refunding process or the charging process is finished, the charging processing unit 13 informs the job control unit 14 that the refunding process or the charging process is finished.

For example, when the card 19 is placed over the card reader 18 and the print setup change key is also continuously operated before data analysis of the third page after the printing the second page is started, so that monochrome designation is changed into color designation, the charged amount of money that is calculated again is a total of 170 yen because two pages of monochrome print is 20 yen and the other three pages of color print is 150 yen. Since the amount of money charged in advance is 50 yen, the difference of 120 yen is the additional fee and 120 yen is charged. Further, on the contrary, when the print setup is changed from color designation to the monochrome designation before data analysis of the third page after printing the second page is started, the difference of 120 yen between the amount of money charged in advance of 250 yen and the charged amount of money of 130 yen that is calculated again is refunded.

Figure 12:
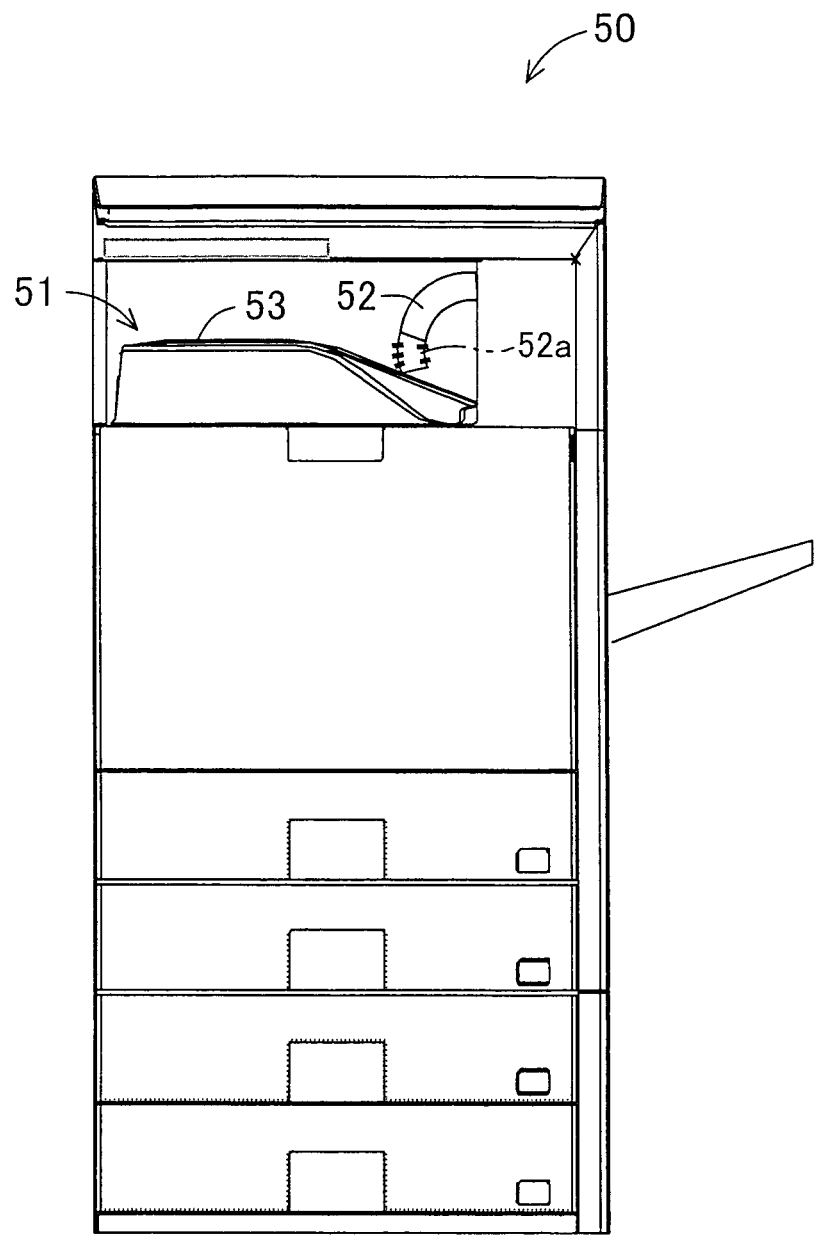
FIG. 12 is a front view of a printing apparatus according to another embodiment.

FIG. 12 is a front view of a printing apparatus 50 according to another embodiment. The printing apparatus 50 is configured by adding a recording paper fixing member 52 to the printing apparatus 10 shown in FIG. 1 and the relating parts other than the recording paper fixing member 52 are the same as those in the printing apparatus 10, so that the description thereof is omitted to avoid repetition. The printing apparatus 50 includes a discharge tray 51 that keeps printed recording paper 53. The discharge tray 51 that serves as a holding unit keeps the discharged recording papers 53 in a stacked state. The recording paper fixing member 52 that serves as a preventing unit prevents a person from removing the recording papers 53 from the discharge tray 51 by pressing the recording papers 53 kept in the discharge tray 51. The recording paper fixing member 52 has a state where the recording paper 53 is not pressed and a state where the recording paper 53 is pressed and includes a driving unit (not shown) for driving switching between these states. In FIG. 12, the recording paper fixing member 52 shows the state where the recording paper 53 is not pressed and the recording paper fixing member 52a shows the state where the recording paper 53 is pressed. In the recording paper fixing member 52, the driving unit is driven in response to an instruction by the charging processing unit 13, so that the state where the recording paper 53 is not pressed and the state where the recording paper 53 is pressed are switched.

Figure 13:
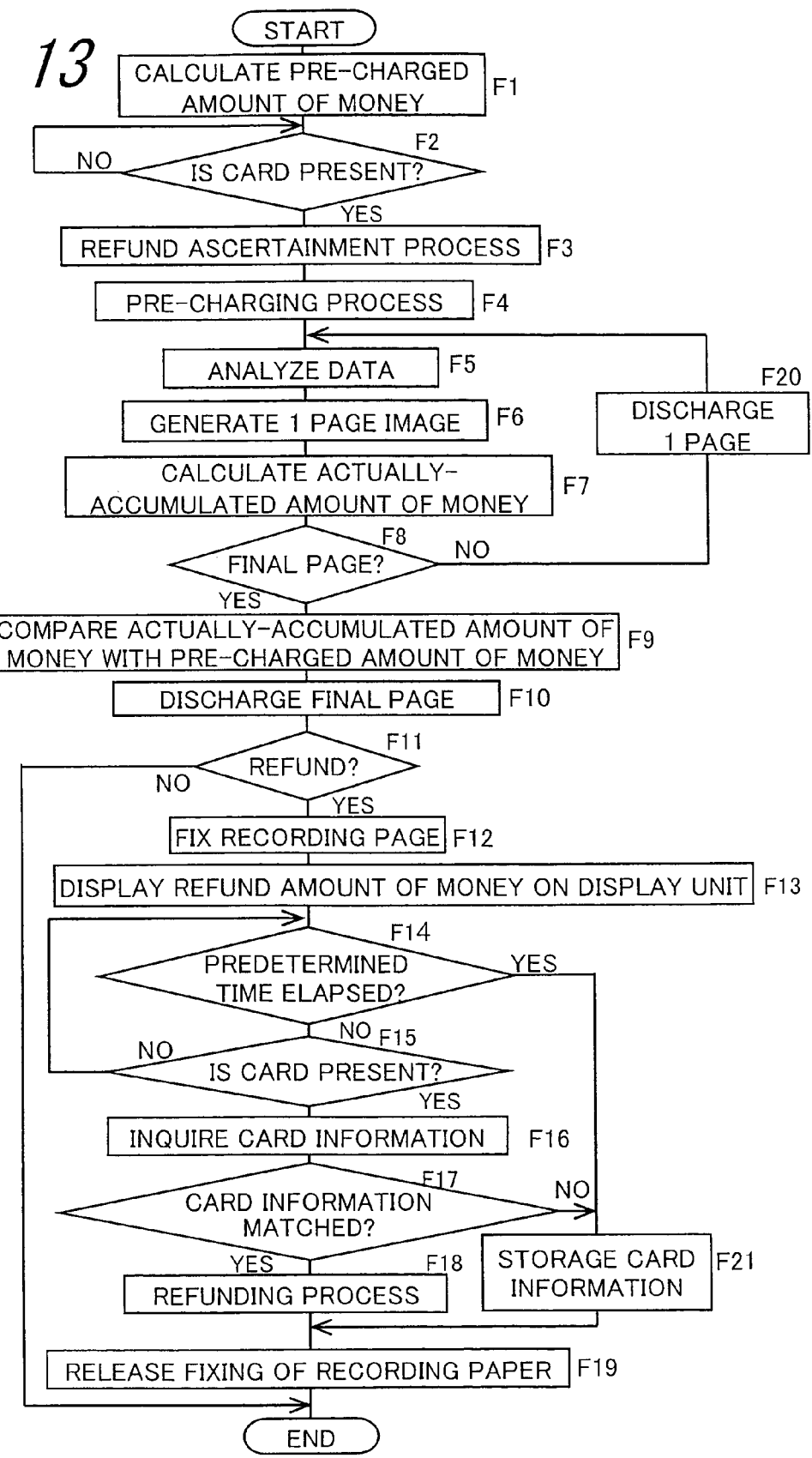
FIG. 13 is a flowchart showing the processing procedure in a second refunding process carried out by the printing apparatus.

FIG. 13 is a flowchart showing the processing procedure in a second refunding process carried out by the printing apparatus 50. When the job control unit 14 receives a print job from the I/O control unit 11, the procedure proceeds to steps F1. Steps F1 to F9, F13 to F18, F20, and F21 are the same as steps A1 to A9, A11 to A16, A18, and A19 of the flowchart shown in FIG. 7, and the description thereof is omitted to avoid repetition.

In step F10, the job control unit 14 sends image data for the final page received from the image generating unit 15 to the engine control unit 16. The engine control unit 16 sends the image data for the final page received from the job control unit 14 to the engine unit 16A, causes the engine unit 16 A to perform printing and to discharge the printed page to the discharge tray 51 after printing.

In step F11, the charging processing unit 13 determines whether there is a refund amount of money. When the pre-charged amount of money calculated in step F1 and the accumulated amount of money are different, the charging processing unit 13 determines that there is a refund amount of money, and the procedure proceeds to step F12. When the charged amount of money calculated in step F1 and the accumulated amount of money match each other, the charging processing unit 13 determines that there is no refund amount of money, and finishes the second refunding process. When the pre-charged amount of money calculated in step F1 and the accumulated amount of money are different, the charging processing unit 13 subtracts the accumulated amount of money from the pre-charged amount of money calculated in step F1 and sets the subtracted result as the refund amount of money, and the procedure proceeds to step F12. Further, when the pre-charged amount of money calculated in step F1 and the accumulated amount of money match each other, the charging processing unit 13 informs the job control unit 14 that there is no need to refund.

In step F12, the charging processing unit 13 causes the recording paper fixing member 52 to press and fix the recording paper 53. By fixing the recording paper 53, the recording paper 53 discharged to the discharge tray 51 is prevented from being taken out of the discharge tray 51.

In step F19, the charging processing unit 13 causes the recording paper fixing member 52 to release the fixing of the recording paper 53 by stopping pressing the recording paper 53, and finishes the second refunding process. By releasing the fixing of the recording paper 53, the recording paper 53 discharged to the discharge tray 51 can be taken out.

As described above, in the second refunding process carried out by the printing apparatus 50, even the final page is printed, but when refund is needed, the recording paper 53 is prevented from being taken out of the discharge tray 51 until the refund is finished, by fixing the discharged recording paper 53 with the recording paper fixing member 52 in the discharge tray 51, and it is possible to reduce generation of a case in which a difference is not settled.

Figure 14:
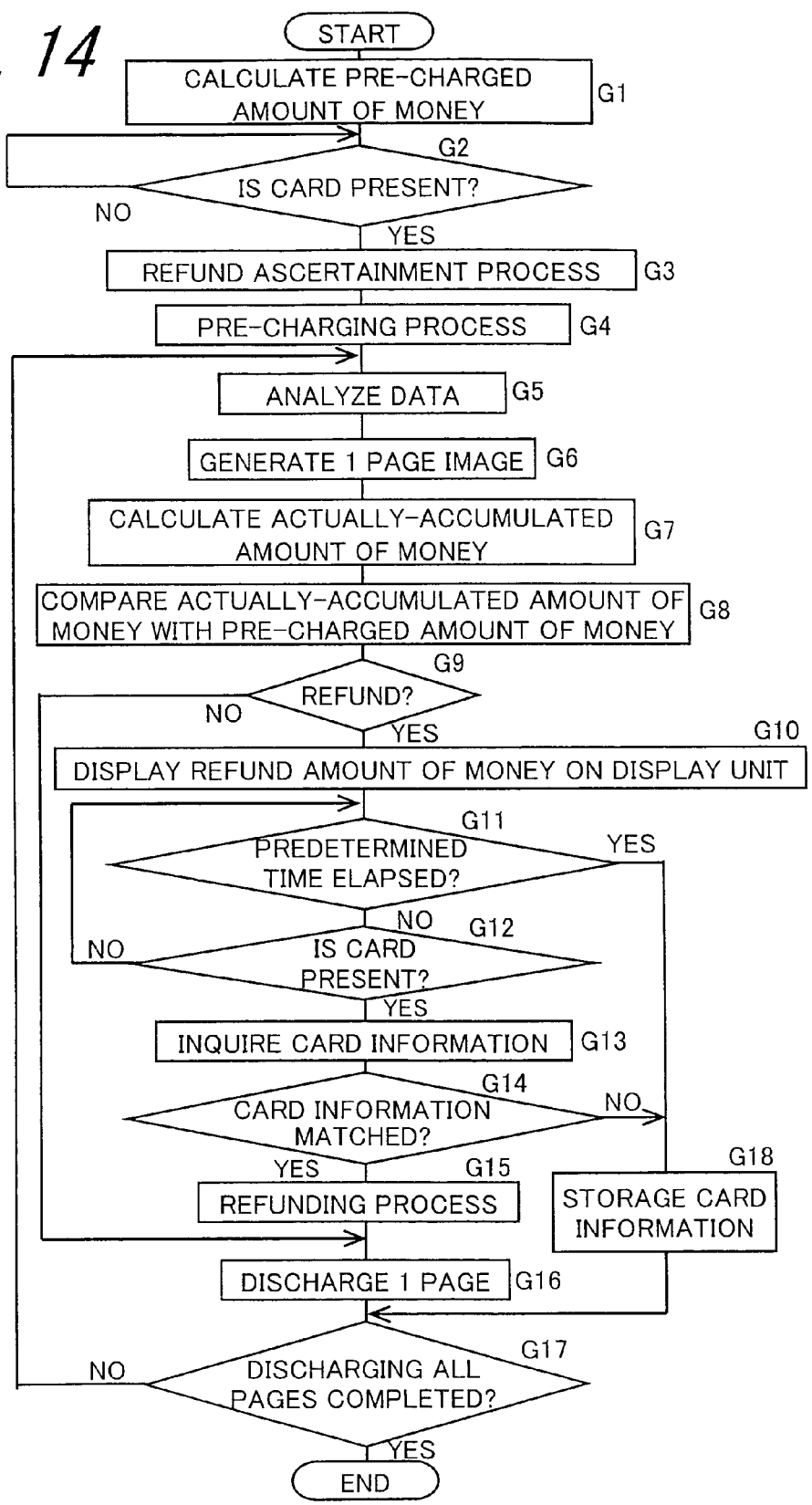
FIG. 14 is a flowchart showing the processing procedure of a third refunding process carried out by the printing apparatus.

FIG. 14 is a flowchart showing the processing procedure of a third refunding process carried out by the printing apparatus 10. In the first refunding process, when there is a refund amount of money, the printing apparatus 10 temporarily stops printing and performs refunding before the final page is printed. On the other hand, in the third refunding process, when there is a refund amount of money, the printing apparatus 10 temporarily stops printing and performs refunding before printing each of the pages, every time the pages are printed. When the job control unit 14 receives a print job from the I/O control unit 11, the procedure proceeds to step G1. Steps G1 to G15 and G18 are the same as steps A1 to A7, A9 to A16, and A19 of the flowchart shown in FIG. 7, and the description thereof is omitted to avoid repetition.

In step G16, the job control unit 14 sends image data for one page received from the image generating unit 15 to the engine control unit 16. The engine control unit 16 sends image data for one page received from the job control unit 14 to the engine unit 16A, and causes the engine unit 16A to perform printing and to discharge the printed page after printing. When the job control unit 14 is informed that discharging is finished, by the engine control unit 16, the procedure proceeds to step G17.

In step G17, the job control unit 14 determines whether discharging all of the pages is completed. When discharging all of the pages is completed, the third refunding process is finished, and when discharging all of the pages is not completed, the procedure returns to step G5, and steps G5 to G16 and G18 are repeated.

As described above, when the card 19 where the amount of money of the charged electronic money is recorded comes in contact with or approaches to the card reader 18, the card reader 18 can read out and rewrite the amount of money recorded on the card 19. The engine control unit 16 and the engine unit 16A print print data based on predetermined print conditions. The charging processing unit 13 calculates the estimate amount of money for the charge that is expected for printing print data based on the predetermined print condition, reads out the amount of money recorded on the card 19 through the card reader 18, subtracting the estimate amount of money from the read-out amount of money, and rewrites the amount of money recorded on the card 19 into the subtracted amount of money through the card reader 18, thereby making pre-charging. When pre-charging is made by the charging processing unit 13, the job control unit 14 causes printing by the engine control unit 16 and the engine unit 16A to be started, and stops a printing process that is a process relating to printing when an estimate-amount-of-money changing factor, which changes the estimate amount of money, is generated after printing by the engine control unit 16 and the engine unit 16A is started. Further, when the printing process is stopped by the job control unit 14, the charging processing unit 13 calculates again the estimate amount of money that changes in accordance with the generation of the estimate-amount-of-money changing factor, and performs settlement by rewriting the amount of money recorded on the card 19 through the card reader 18 based on the estimate amount of money that is calculated again. Further, the job control unit 14 restarts the printing process, after rewriting by the charging processing unit 13 is done.

Therefore, when the estimate-amount-of-money changing factor is generated, for example, when there is possibility of generating a difference in the printing system that makes pre-charging, by prompting the user to present the card 19, the case where settlement of the difference is not made is reduced, by stopping the printing process, that is, applying a limit in the operation of the print job. That is, it is possible to reduce generation of the case where the difference between the amount of money charged in advance by the electronic money for printing and the amount of money for the print result is not settled.

Further, the printing process includes a process of printing by the engine control unit 16 and the engine unit 16A. Further, the job control unit 14 stops the print process by stopping the printing by the engine control unit 16 and the engine unit 16A, so that the printing process, that is, the print job can be stopped and settlement of the difference can be made, by controlling the engine control unit 16 and the engine unit 16A.

Further, the engine control unit 16 and the engine unit 16A print the print data onto a print medium. The discharge tray 51 keeps the printed print medium, for example, the recording paper 53 and the recording paper fixing member 52 prevent the recording paper 53 kept in the discharge tray 51 from being taken out. The print process includes a process of taking out the printed recording paper 53. Further, the job control unit 14 stops the printing process, that is, the print job by preventing the recording paper 53 kept in the discharge tray 51 from being taken out, using the recording paper fixing member 52. Therefore, since the printed print medium is prevented form being taken out until settlement of the difference is finished even though printing up to the final page is finished, it is possible to reduce the case where the difference is not settled.

Further, the job control unit 14 ascertains whether the estimate-amount-of-money changing factor is generated, before the engine control unit 16 and the engine unit 16A finish printing a penultimate page and start printing the final page. Therefore, settlement of the difference is required in order to print the final page, so that it is possible to reduce the case where the difference is not settled.

Further, the job control unit 14 ascertains whether the estimate-amount-of-money changing factor is generated before the engine control unit 16 and the engine unit 16A finish printing each of the pages and start printing the next page. Therefore, it is possible to inform the user that a change is made after charging.

Further, the UI control unit 12 designates a print designation including the automatic color-monochrome designation in which print data is printed in accordance with whether the print data is color or monochrome. The UI control unit 12 inputs a print job including print data for printing by the engine control unit 16 and the engine unit 16A and the number of pages of the print data. The UI control unit 12 notifies the information. The predetermined print conditions include the number of pages included in the print job inputted by the UI control unit 12 and the print designation designated by the UI control unit 12. When the print designation instructed by the designation unit is the automatic color-monochrome designation, the charging processing unit 13 calculates the estimate amount of money, under the assumption that all of the pages are printed in color. The estimate-amount-of-money changing factor includes a first estimate-amount-of-money changing factor in which the amount of charge for printing in the automatic color-monochrome designation does not match the estimate amount of money. Further, the job control unit 14 causes the engine control unit 16 and the engine unit 16A to stop printing when the first estimate-amount-of-money changing factor is generated, that is, when the estimate amount of money is calculated under the assumption that all of the pages are printed in color, and a page printed in monochrome is generated. Further, the charging processing unit 13 informs that the UI control unit 12 of a request for contacting or approaching the card 19 to the card reader 18, and rewrites the amount of money recorded on the card 19 through the card reader 18 based on the re-calculated estimate amount of money, when the card 19 comes in contact with or approaches to the card reader 18, in response to the notification of the UI control unit 12.

Therefore, when a difference is refunded, printing is restarted after the difference is refunded to the card 19 by requesting to place the card 19 again before the print job is finished, so that it is possible to prevent the user from missing the refunding process.

Further, on the card 19 is recorded card information for identifying the possessor of the card 19. The charging processing unit 13 reads out the card information recorded on the card 19 through the card reader 18, when pre-charging is made, and when the card 19 does not come in contact with or approaches to the card reader 18 within a predetermined time in response to the notification of the UI control unit 12, the re-calculated estimate amount of money and the card information read out during pre-charging are stored in the storage unit in association with each other.

Therefore, when the request for contacting or approaching the card 19 to the card reader 18 is continually notified, for example, the message requesting the card that is displayed for refund is continually displayed, it may be considered that the next user places the card 19 by mistake. When a predetermined time set by the manager has passed, it is possible to minimize influence on the next user by keeping the information on the previous user, that is, the card information and removing the display of the message.

Further, on the card 19 is recorded card information for identifying the possessor of the corresponding card 19. When making pre-charging, the charging processing unit 13 reads out the card information recorded on the card 19 through the card reader 18, and read out the card information from the card 19 through the card reader 18 when the card 19 comes in contact with or approaches to the card reader 18 within a predetermined time in response to the notification of the UI control unit 12, and stores the re-calculated estimate amount of money and the card information read out during pre-charging in association with each other, when the read-out card information and the card information read out during pre-charging are different.

Therefore, when the next user places another card 19 and it is determined that the card 19 is another card by inquiring the card 19, the difference is not refunded and the card information of the card 19 that should be refunded, that is, the card information and the refund amount of money are temporarily stored, so that it is possible to start the print job of the next user. That is, it is possible to prevent the printing apparatus from being locked by missing the refunding process.

Further, when the card 19 comes in contact with or approaches to the card reader 18, the charging processing unit 13 reads out the card information from the card 19 through the card reader 18, and when the read-out card information matches the card information stored in the storage unit to correspond to the re-calculated estimate amount of money, the charging processing unit 13 performs settlement by rewriting the amount of money recorded on the card 19 having the same card information through the card reader 18, based on the re-calculated estimate amount of money stored in the storage unit 17. Further, the job control unit 14 causes the engine control unit 16 and the engine unit 16A to print print data included in a new print job inputted by the UI control unit 12, after rewriting by the charging processing unit 13 is done. Therefore, even if the user misses the refunding process, it is possible to perform the refunding process by placing again the card 19 next time.

Further, the I/O control unit 11 communicates information with another printing apparatus. When the card 19 comes in contact with or approaches to the card reader 18, the charging processing unit 13 reads out the card information from the card 19 through the card reader 18, and transmits the read-out card information to another printing apparatus through the I/O control unit 11, and when the fact that card information matching the transmitted card information and the re-calculated estimate amount of money associated with the card information are stored in the storage unit 17 of the another printing apparatus, and the estimate amount of money stored in the storage unit 17 are received from another printing apparatus through the I/O control unit 11, the charging processing unit 13 rewrites the amount of money recorded on the card 19 through the card reader 18, based on the estimate amount of money received by the I/O control unit 11. Therefore, it is possible to refund the refund amount of money generated in a specific printing apparatus, even in another printing apparatus connected to the network, so that convenience of the user is improved.

Further, on the card 19 is recorded card information for identifying the possessor of the corresponding card 19. The I/O control unit 11 communicates information with the server apparatus. The charging processing unit 13 reads out the card information recorded on the card 19 through the card reader 18, when making pre-charging, and transmits the re-calculated estimate amount of money and the read-out card information to the server apparatus through the I/O control unit 11 and causes the server apparatus to store them, when the card 19 does not come in contact with or approach to the card reader 18 within a predetermined time in response to the notification of the UI control unit 12, or when the card 19 comes in contact with or approaches to the card reader 18 within a predetermined time in response to the notification of the UI control unit 12 and the card information read out from the card 19 by the card reader 18 is different from the read-out card information.

Therefore, the card information, that is, the card information and the refund amount of money are not managed in each printing apparatus, but centrally managed by the server apparatus, so that convenience of the manager is improved. For example, it may be possible not to be in conscious of that the information on the refund amount of money remains in the printing apparatus when the printing apparatus is replaced or abolished.

Further, the UI control unit 12 notifies information. The charging processing unit 13 notifies the UI control unit 12 that printing can be stopped by contacting or approaching the card 19 to the card reader 18, for example, of the message saying "please place the card again to cancel the job or change the print setup", after the job control unit 14 causes the engine control unit 16 and the engine unit 16A to start printing. The job control unit 14 causes the engine control unit 16 and the engine unit 16A to stop printing, when the card 19 comes in contact with or approaches to the card reader 18, in response to the notification of the UI control unit 12. The charging processing unit 13 notifies the UI control unit 12 of ascertainment information that ascertains stop of printing, for example, the cancel key when printing by the engine control unit 16 and the engine unit 16A is stopped by the job control unit 14, calculates again the estimate amount of money when print stop information instructing stop of printing, for example, information showing the point contacted to the touch sensor at the position showing the print setup change key is inputted by the UI control unit 12, in response to the notification of the ascertainment information by the UI control unit 12, and performs settlement by rewriting the amount of money recorded on the card 19 through the card reader 18 based on the re-calculated estimate amount of money. Further, the job control unit 14 causes the engine control unit 16 and the engine unit 16A to stop the printing, after rewriting by the charging processing unit 13 is done.

Therefore, it is possible to prevent the refunding process from being missed when a job is canceled, not by refunding the difference by placing the card 19 after printing is stopped, that is, the print job is finished being canceled, but by placing the card 19 to turn to a state where stop of printing is ascertained, for example, a state where the cancel execution key can be pressed, and performing refunding at the pressing-timing.

Further, the display unit 12A of the UI control unit 12 displays information. The estimate-amount-of-money changing factor includes the second estimate amount of money changing factor that is an estimate-amount-of-money changing factor changing the predetermined print conditions, that is, an operation for changing the print setup. The charging processing unit 13 causes the display unit 12A to display that the predetermined print conditions can be changed by contacting or approaching the card 19 to the card reader 18, for example, the message saying "please place the card again to cancel the job or change the print setup", after the job control unit 14 causes the engine control unit 16 and the engine unit 16A to start printing. The job control unit 14 causes the engine control unit 16 and the engine unit 16A to stop the printing, when the card 19 comes in contact with or approaches to the card reader 18 in response to the display by the display unit 12A of the UI control unit 12. Further, the charging processing unit 13 calculates again the estimate amount of money based on the predetermined print conditions changed by the second estimate-amount-of-money changing factor when the printing by the engine control unit 16 and the engine unit 16A is stopped by the job control unit 14, and refunds the difference to the card 19 through the card reader 18 when the re-calculated estimate amount of money is smaller than the pre-charged amount of money.

Therefore, when the predetermined print condition, for example, the print setup is changed and the refund amount of money is generated during printing, for example, while a print job is carried out, it is possible to prevent the user from missing the refunding process, not by refunding the difference by placing the card 19 after the print job is finished, but by placing the card 19 to turn to a state where the configuration can be changed, and allowing refunding at a specific timing when the configuration change is determined.

Further, the display unit 12A of the UI control unit 12 displays information. The estimate-amount-of-money changing factor includes the second estimate amount of money changing factor that is an estimate-amount-of-money changing factor changing the predetermined print conditions, that is, an operation for changing the print setup. The charging processing unit 13 causes the display unit 12A to display that the predetermined print conditions can be changed by contacting or approaching the card 19 to the card reader 18, for example, the message saying "please place the card again to cancel the job or change the print setup", after the job control unit 14 causes the engine control unit 16 and the engine unit 16A to start printing. The job control unit 14 causes the engine control unit 16 and the engine unit 16A to stop the printing, when the card 19 comes in contact with or approaches to the card reader 18 in response to the display by the display unit 12A of the UI control unit 12. Further, the charging processing unit 13 calculates again the estimate amount of money based on the predetermined print conditions changed by the second estimate-amount-of-money changing factor when the printing by the engine control unit 16 and the engine unit 16A is stopped by the job control unit 14, and charges the difference as an additional fee to the card 19 through the card reader 18 when the re-calculated estimate amount of money is larger than the pre-charged amount of money.

Therefore, when the predetermined print condition, for example, the print setup is changed and the additional fee is generated during printing, for example, while a print job is carried out, it is possible to prevent the user from missing the charging process, not by charging by placing the card 19 after the print job is finished, but by placing the card 19 to turn to a state where the print setup can be changed, and charging at a timing when the print setup is changed.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A printing apparatus comprising:
a recording unit that reads out and rewrites an amount of money recorded on a recording medium which has come in contact therewith or has approached thereto;
a printing unit that prints print data based on predetermined print conditions;
a pre-charging unit that makes pre-charging by calculating an estimate amount of charge that is estimated to be required for printing the print data based on the predetermined print conditions, reading out the amount of money recorded on the recording medium through the recording unit, subtracting the estimate amount of charge from the read-out amount of money, and rewriting the amount of money recorded on the recording medium into the subtracted amount of money through the recording unit;
a control unit that causes printing by the printing unit to be started when pre-charging is made by the pre-charging unit, and stops a printing process that is a process relating to printing when an estimate-amount-of-money changing factor which causes a change in the estimate amount of money is generated after initiation of the printing in the printing unit;
a designating unit that designates a print mode including an automatic color-monochrome mode that prints print data in accordance with color or monochrome; and
an input unit that inputs print information including print data for printing in the print unit and a number of pages for the print data,
the predetermined print condition including at least a number of pages included in the print information inputted by the input unit and the print mode designated by the designating unit,
the estimate-amount-of-money changing factor including a first estimate-amount-of-money charging factor in which the amount of money for the automatic color-monochrome mode does not match the estimate amount of money,
the pre-charging unit calculating the estimate amount of money under an assumption that the all pages are printed in color, when the print mode designated by the designating unit is the automatic color-monochrome mode,
the pre-charging unit calculating again the estimate amount of money changing in accordance with the generation of the estimate-amount-of-money changing factor when the printing process is stopped by the control unit, and making settlement by rewriting the amount of money recorded on the recording medium by the recording unit based on a re-calculated estimate amount of money, and
the control unit causing the printing unit to restart the printing process after the rewriting by the pre-charging unit is done.

2. The printing apparatus of claim 1, wherein the printing process includes a process of printing by the printing unit, and
the control unit causes the printing unit to stop the printing process.

3. The printing apparatus of claim 2, wherein the control unit ascertains whether an estimate-amount-of-money changing factor is generated before the printing unit finishes printing a penultimate page and starts printing a final page.

4. The printing apparatus of claim 2, further comprising:
a notification unit that notifies the information, wherein
the pre-charging unit causes the notification unit to notify that the recording medium is requested to come in contact with or approach to the recording unit, and
rewrites the amount of money recorded on the recording unit through the recording unit based on the recalculated estimate amount of money, when the recording medium comes in contact with or approaches to the recording unit in response to the notification of the notification unit.

5. The printing apparatus of claim 4, further comprising a storage unit,
wherein possessor identification information for identifying a possessor of the recording medium is recorded on the recording medium, and
the pre-charging unit reads out the possessor identification information recorded on the recording medium through the recording unit when making pre-charging, and
stores the re-calculated estimate amount of money and the possessor identification information read out during pre-charging in the storage unit to correspond to each other, when the recording medium does not come in contact with or approach to the recording unit within a predetermined time in response to the notification of the notification unit.

6. The printing apparatus of claim 4, further comprising a storage unit,
wherein possessor identification information for identifying the possessor of the recording medium is recorded on the recording medium,
the pre-charging unit reads out the possessor identification information from the recording medium through the recording unit when making pre-charging, and
reads out the possessor identification information from the recording medium through the recording unit when the recording medium comes in contact with or approaches to the recording unit within a predetermined time in response to the notification of the notification unit, and stores the re-calculated estimate amount of money and the possessor identification information read out during pre-charging in the storage unit in association with each other when the read-out possessor identification information is different from the possessor identification information read out during the pre-charging.

7. The printing apparatus of claim 5, wherein
the pre-charging unit reads out the possessor identification information from the recording medium through the recording unit when the recording medium comes in contact with or approaches to the recording unit, and performs settlement by rewriting the amount of money recorded on the recording medium having the same possessor identification information through the recording unit, based on the re-calculated estimate amount of money that is stored in the storage unit when the read-out possessor identification information matches the possessor identification information that is stored, in association with the estimate amount of money calculated again in the storage unit, and
the control unit causes the printing unit to print print data included in new print information inputted by the input unit, after rewriting by the pre-charging unit is done.

8. Thee printing apparatus of claim 6, wherein
the pre-charging unit reads out the possessor identification information from the recording medium through the recording unit when the recording medium comes in contact with or approaches to the recording unit, and performs settlement by rewriting the amount of money recorded on the recording medium having the same possessor identification information through the recording unit, based on the re-calculated estimate amount of money that is stored in the storage unit when the read-out possessor identification information matches the possessor identification information that is stored, in association with the estimate amount of money calculated again in the storage unit, and the control unit causes the printing unit to print print data included in new print information inputted by the input unit, after rewriting by the pre-charging unit is done.

9. The printing apparatus of claim 5, further comprising a communication unit that communicates information with another printing apparatus, wherein, when the recording medium comes in contact with or approaches to the recording unit, the pre-charging unit reads out the possessor identification information from the recording medium through the recording unit and transmits the read-out possessor identification information to another printing apparatus through the communication unit, and when a fact that possessor identification information that matches the transmitted possessor identification information, and the estimate amount of money that is calculated again, associated with the possessor identification information are stored in the storage unit of another printing apparatus, and the estimate amount of money stored in the storage unit are received by the communication unit from the another printing apparatus, the pre-charging unit rewrites the amount of money recorded on the recording medium through the recording unit, based on the estimate amount of money received by the communication unit.

10. The printing apparatus of claim 6, further comprising a communication unit that communicates information with another printing apparatus, wherein, when the recording medium comes in contact with or approaches to the recording unit, the pre-charging unit reads out the possessor identification information from the recording medium through the recording unit and transmits the read-out possessor identification information to another printing apparatus through the communication unit, and when a fact that possessor identification information that matches the transmitted possessor identification information, and the estimate amount of money that is calculated again, associated with the possessor identification information are stored in the storage unit of another printing apparatus, and the estimate amount of money stored in the storage unit are received by the communication unit from the another printing apparatus, the pre-charging unit rewrites the amount of money recorded on the recording medium through the recording unit, based on the estimate amount of money received by the communication unit.

11. The printing apparatus of claim 4, wherein on the recording medium is stored possessor identification information for identifying a possessor of the recording medium, the printing apparatus further comprises a communication unit that communicates information with a server apparatus, the pre-charging unit reads out in pre-charging the processor identification information recorded on the recording medium, through the recording unit, and when the recording medium does not come in contact with or approach to the recording unit within a predetermined time in response to the notification of the notification unit, or when the recording medium comes in contact with or approaches to the recording unit within a predetermined time in response to the notification of the notification unit and the possessor identification information read out from the recording medium by the recording unit is different from the read-out possessor identification information, the pre-charging unit transmits the re-calculated estimate amount of money and the read-out possessor identification information to the server apparatus through the communication unit, and causes the server apparatus to store them.

* * * * *